(12) United States Patent
Carter et al.

(10) Patent No.: US 10,730,541 B2
(45) Date of Patent: Aug. 4, 2020

(54) NAVIGATION SYSTEMS AND METHODS FOR WHEELED OBJECTS

(71) Applicant: Gatekeeper Systems, Inc., Irvine, CA (US)

(72) Inventors: Scott J. Carter, Seal Beach, CA (US); Stephen E. Hannah, Placentia, CA (US); Jesse M. James, Ladera Ranch, CA (US)

(73) Assignee: Gatekeeper Systems, Inc., Foothill Ranch, CA (US)

( * ) Notice: Subject to any disclaimer, the term of this patent is extended or adjusted under 35 U.S.C. 154(b) by 0 days.

(21) Appl. No.: 15/468,581

(22) Filed: Mar. 24, 2017

(65) Prior Publication Data

US 2018/0037246 A1 Feb. 8, 2018

Related U.S. Application Data

(60) Continuation of application No. 14/299,957, filed on Jun. 9, 2014, now Pat. No. 9,630,639, which is a (Continued)

(51) Int. Cl.
*B62B 5/04* (2006.01)
*B62B 3/14* (2006.01)
(Continued)

(52) U.S. Cl.
CPC ............ *B62B 5/0438* (2013.01); *A47F 10/04* (2013.01); *B60K 25/08* (2013.01); *B60T 7/16* (2013.01);
(Continued)

(58) Field of Classification Search
CPC combination set(s) only.
See application file for complete search history.

(56) References Cited

U.S. PATENT DOCUMENTS 2,964,140 A 12/1960 Berezny
3,002,370 A 10/1961 La Brie
(Continued)

FOREIGN PATENT DOCUMENTS

CA 2620062 C 10/2015
CN 101171147 B 7/2011
(Continued)

OTHER PUBLICATIONS

Sales presentation of Gatekeeper Systems, Inc. for Purchek™ push-out prevention system, 2004.
(Continued)

*Primary Examiner* — Redhwan K Mawari
(74) *Attorney, Agent, or Firm* — Knobbe, Martens, Olson & Bear, LLP

(57) ABSTRACT

A navigation system uses a dead reckoning method to estimate an object's present position relative to one or more prior positions. In some embodiments, the dead reckoning method determines a change in position from the object's heading and speed during an elapsed time interval. In embodiments suitable for use with wheeled objects, the dead reckoning method determines the change in position by measuring the heading and the amount of wheel rotation. Some or all of the components of the navigation system may be disposed within a wheel, such as a wheel of a shopping cart.

22 Claims, 12 Drawing Sheets

Related U.S. Application Data division of application No. 13/209,219, filed on Aug. 12, 2011, now Pat. No. 8,751,148, which is a division of application No. 11/277,027, filed on Mar. 20, 2006, now Pat. No. 8,046,160.

(60) Provisional application No. 60/663,327, filed on Mar. 18, 2005, provisional application No. 60/663,147, filed on Mar. 18, 2005, provisional application No. 60/663,195, filed on Mar. 18, 2005.

(51) Int. Cl.

| | | |
|---|---|---|
| *H04W 4/024* | (2018.01) | |
| *G08B 13/24* | (2006.01) | |
| *B60K 25/08* | (2006.01) | |
| *B60T 7/18* | (2006.01) | |
| *G01C 21/00* | (2006.01) | |
| *G01C 21/12* | (2006.01) | |
| *G06Q 10/08* | (2012.01) | |
| *G08G 1/00* | (2006.01) | |
| *H02K 7/18* | (2006.01) | |
| *H04W 4/029* | (2018.01) | |
| *A47F 10/04* | (2006.01) | |
| *B60T 7/16* | (2006.01) | |
| *G01C 21/20* | (2006.01) | |
| *B62B 5/00* | (2006.01) | |
| *G06K 7/10* | (2006.01) | |

(52) U.S. Cl.
CPC .................. *B60T 7/18* (2013.01); *B62B 3/14* (2013.01); *B62B 3/1404* (2013.01); *B62B 3/1412* (2013.01); *B62B 3/1424* (2013.01); *B62B 3/1492* (2013.01); *B62B 5/0003* (2013.01); *B62B 5/048* (2013.01); *B62B 5/0423* (2013.01); *G01C 21/00* (2013.01); *G01C 21/12* (2013.01); *G01C 21/206* (2013.01); *G06K 7/10366* (2013.01); *G06Q 10/08* (2013.01); *G08B 13/2434* (2013.01); *G08B 13/2448* (2013.01); *G08B 13/2462* (2013.01); *G08B 13/2482* (2013.01); *G08G 1/20* (2013.01); *H02K 7/1846* (2013.01); *H04W 4/024* (2018.02); *H04W 4/029* (2018.02); *G08B 13/246* (2013.01); *G08B 13/2474* (2013.01); *G08B 13/2477* (2013.01); *Y10T 16/195* (2015.01); *Y10T 29/49826* (2015.01)

(56) References Cited

U.S. PATENT DOCUMENTS

| | | | |
|---|---|---|---|
| 3,031,037 A | | 4/1962 | Stollman |
| 3,031,038 A | | 4/1962 | Chait |
| 3,117,655 A | | 1/1964 | Skupas et al. |
| 3,317,841 A | | 5/1967 | Umanoff |
| 3,340,710 A | | 9/1967 | O'Brien |
| 3,380,546 A | | 4/1968 | Rabjohn |
| 3,394,945 A | | 7/1968 | Steier et al. |
| 3,475,036 A | | 10/1969 | Smith |
| 3,590,962 A | | 7/1971 | Parker et al. |
| 3,652,103 A | | 3/1972 | Higgs |
| 4,037,882 A | | 7/1977 | Taylor |
| 4,093,900 A | | 6/1978 | Plunkett |
| 4,242,668 A | | 12/1980 | Herzog |
| 4,577,880 A | | 3/1986 | Bianco |
| 4,591,175 A | | 5/1986 | Upton et al. |
| 4,628,454 A | | 12/1986 | Ito |
| 4,629,036 A | | 12/1986 | Choy |
| 4,742,857 A | | 5/1988 | Gandhi |
| 4,748,395 A | | 5/1988 | Reynolds |
| 4,772,880 A | | 9/1988 | Goldstein et al. |
| 4,849,735 A | | 7/1989 | Kirtley et al. |
| 4,868,544 A | | 9/1989 | Havens |
| 4,882,932 A | * | 11/1989 | Corghi .................. G01M 1/28 73/457 |
| 4,926,161 A | | 5/1990 | Cupp |
| 4,973,952 A | | 11/1990 | Malec et al. |
| 5,000,297 A | | 3/1991 | Shaw et al. |
| 5,036,935 A | | 8/1991 | Kohara |
| 5,053,692 A | | 10/1991 | Craddock |
| 5,053,768 A | | 10/1991 | Dix, Jr. |
| 5,068,654 A | | 11/1991 | Husher |
| 5,072,956 A | | 12/1991 | Tannehill |
| 5,115,159 A | | 5/1992 | Takamiya et al. |
| 5,194,844 A | * | 3/1993 | Zelda .................... B62B 5/0423 180/167 |
| 5,250,789 A | | 10/1993 | Johnson |
| 5,283,550 A | | 2/1994 | MacIntyre |
| 5,287,266 A | | 2/1994 | Malec et al. |
| 5,315,290 A | * | 5/1994 | Moreno ................. B60B 33/00 280/33.994 |
| 5,318,144 A | | 6/1994 | Berlinger, Jr. |
| 5,357,182 A | | 10/1994 | Wolfe et al. |
| 5,382,854 A | | 1/1995 | Kawamoto et al. |
| 5,394,962 A | | 3/1995 | Gray |
| 5,402,106 A | | 3/1995 | DiPaolo et al. |
| 5,406,271 A | | 4/1995 | Sonnendorfer et al. |
| 5,426,561 A | | 6/1995 | Yen et al. |
| 5,432,412 A | | 7/1995 | Harris et al. |
| 5,434,290 A | | 7/1995 | Alofs et al. |
| 5,434,781 A | * | 7/1995 | Alofs ....................... B62D 1/28 180/168 |
| 5,438,319 A | | 8/1995 | Zeytoonjian et al. |
| 5,446,656 A | | 8/1995 | Koseki et al. |
| 5,485,520 A | | 1/1996 | Chaum et al. |
| 5,491,670 A | | 2/1996 | Weber |
| 5,525,967 A | | 6/1996 | Azizi et al. |
| 5,554,921 A | | 9/1996 | Li et al. |
| 5,572,108 A | | 11/1996 | Windes |
| 5,574,469 A | | 11/1996 | Hsu |
| 5,576,691 A | | 11/1996 | Coakley et al. |
| 5,580,093 A | | 12/1996 | Conway |
| 5,586,050 A | | 12/1996 | Makel et al. |
| 5,598,144 A | | 1/1997 | Lace |
| 5,600,191 A | | 2/1997 | Yang |
| 5,607,030 A | | 3/1997 | Swift et al. |
| 5,640,146 A | | 6/1997 | Campana, Jr. |
| 5,646,616 A | | 7/1997 | Komatsu |
| 5,719,555 A | | 2/1998 | Zeytoonjian et al. |
| 5,745,036 A | | 4/1998 | Clare |
| 5,806,862 A | | 9/1998 | Merryman et al. |
| 5,818,134 A | | 10/1998 | Yang et al. |
| 5,821,513 A | | 10/1998 | O'Hagan et al. |
| 5,821,856 A | | 10/1998 | Lace |
| 5,831,530 A | | 11/1998 | Lace et al. |
| 5,949,331 A | | 9/1999 | Schofield et al. |
| 6,002,348 A | | 12/1999 | Greene et al. |
| 6,008,546 A | | 12/1999 | Sage |
| 6,024,655 A | * | 2/2000 | Coffee ................ A63B 24/0021 473/407 |
| 6,037,869 A | | 3/2000 | Lace |
| 6,100,615 A | | 8/2000 | Birkestrand |
| 6,102,414 A | | 8/2000 | Schweninger |
| 6,123,259 A | * | 9/2000 | Ogasawara ........ G06K 17/0022 235/380 |
| 6,125,972 A | | 10/2000 | French et al. |
| 6,127,927 A | * | 10/2000 | Durban .................. B60R 25/09 340/568.5 |
| 6,138,912 A | | 10/2000 | Mitsuno |
| 6,144,916 A | | 11/2000 | Wood, Jr. et al. |
| 6,161,849 A | | 12/2000 | Schweninger |
| 6,173,817 B1 | | 1/2001 | Gray |
| 6,181,253 B1 | | 1/2001 | Eschenbach et al. |
| 6,187,471 B1 | | 2/2001 | McDermott et al. |
| 6,201,497 B1 | | 3/2001 | Snyder et al. |
| 6,204,772 B1 | | 3/2001 | DeMay et al. |
| 6,217,398 B1 | | 4/2001 | Davis |
| 6,232,884 B1 | | 5/2001 | Gabbard |
| 6,342,769 B1 | | 1/2002 | Birkestrand et al. |

(56) References Cited

U.S. PATENT DOCUMENTS

| | | | |
|---|---|---|---|
| 6,353,388 B1 | 3/2002 | Durban et al. | |
| 6,355,996 B1 | 3/2002 | Birkestrand | |
| 6,362,728 B1 | 3/2002 | Lace et al. | |
| 6,374,955 B1 | 4/2002 | Gray | |
| 6,378,663 B1 | 4/2002 | Lee | |
| 6,398,395 B1 | 6/2002 | Hyun | |
| 6,424,115 B1 | 7/2002 | Holl | |
| 6,446,005 B1* | 9/2002 | Bingeman | A63B 24/0021 180/167 |
| 6,481,518 B1 | 11/2002 | Wu | |
| 6,502,669 B1 | 1/2003 | Harris | |
| 6,529,164 B1 | 3/2003 | Carter | |
| 6,597,136 B2 | 7/2003 | Burton et al. | |
| 6,628,107 B1 | 9/2003 | Bang et al. | |
| 6,650,242 B2 | 11/2003 | Clerk | |
| 6,707,424 B1 | 3/2004 | Snyder et al. | |
| 6,717,511 B2 | 4/2004 | Parker et al. | |
| 6,739,675 B1 | 5/2004 | Scharpf et al. | |
| 6,744,356 B2 | 6/2004 | Hamilton et al. | |
| 6,774,503 B1 | 8/2004 | Chen | |
| 6,784,800 B2 | 8/2004 | Orzechowski | |
| 6,832,884 B2 | 12/2004 | Robinson | |
| 6,868,318 B1 | 3/2005 | Cawthorne et al. | |
| 6,894,614 B2 | 5/2005 | Eckstein et al. | |
| 6,903,682 B1 | 6/2005 | Maddox | |
| 6,911,908 B1 | 6/2005 | Beart | |
| 6,928,343 B2 | 8/2005 | Cato | |
| 6,945,366 B2 | 9/2005 | Taba | |
| 6,971,464 B2* | 12/2005 | Marino | B60T 7/16 180/167 |
| 6,974,399 B2 | 12/2005 | Lo | |
| 7,053,823 B2* | 5/2006 | Cervinka | G08B 25/08 342/357.31 |
| 7,061,749 B2 | 6/2006 | Liu et al. | |
| 7,084,765 B2 | 8/2006 | Clapper | |
| 7,087,029 B2 | 8/2006 | Friedland | |
| 7,087,327 B2 | 8/2006 | Pearson | |
| 7,183,910 B2 | 2/2007 | Alvarez et al. | |
| 7,199,709 B2* | 4/2007 | Parsons | B62B 3/1404 340/539.13 |
| 7,218,225 B2 | 5/2007 | Wieth et al. | |
| 7,239,965 B2 | 7/2007 | Wehrien et al. | |
| 7,277,010 B2 | 10/2007 | Joao | |
| 7,353,089 B1 | 4/2008 | McEvoy | |
| 7,392,872 B2 | 7/2008 | Chiu et al. | |
| 7,397,373 B2 | 7/2008 | Hunt | |
| 7,420,301 B2 | 9/2008 | Veny et al. | |
| 7,658,247 B2 | 2/2010 | Carter | |
| 7,870,916 B2 | 1/2011 | Carter | |
| 7,944,368 B2 | 5/2011 | Carter et al. | |
| 8,046,160 B2 | 10/2011 | Carter et al. | |
| 8,463,540 B2 | 6/2013 | Hannah et al. | |
| 8,558,698 B1 | 10/2013 | Hannah et al. | |
| 8,674,845 B2 | 3/2014 | Carter et al. | |
| 8,751,148 B2 | 6/2014 | Carter et al. | |
| 8,820,447 B2 | 9/2014 | Carter et al. | |
| 8,894,086 B2 | 11/2014 | Ekbote | |
| 9,205,702 B2 | 12/2015 | Hannah et al. | |
| 9,403,548 B2 | 8/2016 | Hannah et al. | |
| 9,586,606 B2 | 3/2017 | Carter et al. | |
| 9,630,639 B2 | 4/2017 | Carter et al. | |
| 9,669,659 B2 | 6/2017 | McKay et al. | |
| 10,227,082 B2 | 3/2019 | Carter et al. | |
| 2001/0008191 A1 | 7/2001 | Smith et al. | |
| 2001/0024174 A1* | 9/2001 | Turner | G01S 5/06 342/465 |
| 2001/0028301 A1* | 10/2001 | Geiger | B62B 3/1408 340/5.91 |
| 2001/0038301 A1* | 11/2001 | Gul | G05F 3/265 327/103 |
| 2002/0140405 A1 | 10/2002 | Malik | |
| 2002/0167916 A1 | 11/2002 | Clapper | |
| 2002/0175825 A1 | 11/2002 | Clerk et al. | |
| 2002/0196151 A1* | 12/2002 | Troxler | G01C 21/005 340/573.4 |
| 2003/0085064 A1 | 5/2003 | Turner | |
| 2003/0102969 A1 | 6/2003 | Parsons | |
| 2003/0106731 A1 | 6/2003 | Marino et al. | |
| 2003/0132932 A1 | 7/2003 | Yang | |
| 2003/0206102 A1 | 11/2003 | Joao | |
| 2004/0102896 A1 | 5/2004 | Thayer et al. | |
| 2004/0230370 A1 | 11/2004 | Tzamaloukas | |
| 2005/0027443 A1* | 2/2005 | Cato | G06Q 10/0875 701/472 |
| 2005/0060069 A1 | 3/2005 | Breed et al. | |
| 2005/0073418 A1* | 4/2005 | Kelliher | G08B 13/19608 340/572.1 |
| 2005/0088299 A1* | 4/2005 | Bandy | G01N 33/0075 340/539.16 |
| 2005/0138077 A1 | 6/2005 | Michael et al. | |
| 2005/0155824 A1 | 7/2005 | Taba | |
| 2005/0187819 A1* | 8/2005 | Johnson | B62B 3/1424 705/14.42 |
| 2005/0259240 A1* | 11/2005 | Goren | G01C 21/12 356/28 |
| 2005/0275513 A1 | 12/2005 | Grisham et al. | |
| 2005/0279589 A1 | 12/2005 | Gray | |
| 2006/0067226 A1 | 3/2006 | Chandra et al. | |
| 2006/0095324 A1* | 5/2006 | Vergeyle | G06Q 30/02 705/14.38 |
| 2006/0136303 A1 | 6/2006 | Bell et al. | |
| 2006/0144933 A1* | 7/2006 | Do | G07G 1/0054 235/383 |
| 2006/0247847 A1* | 11/2006 | Carter | B62B 3/14 701/498 |
| 2006/0290494 A1* | 12/2006 | O'Brien | A47F 9/046 340/568.5 |
| 2007/0045018 A1 | 3/2007 | Carter et al. | |
| 2007/0104981 A1 | 5/2007 | Lam et al. | |
| 2007/0225879 A1 | 9/2007 | French et al. | |
| 2007/0240903 A1 | 10/2007 | Alft et al. | |
| 2008/0316059 A1 | 12/2008 | Hannah et al. | |
| 2009/0002160 A1 | 1/2009 | Hannah et al. | |
| 2009/0002172 A1 | 1/2009 | Hannah et al. | |
| 2012/0249325 A1 | 10/2012 | Christopher | |
| 2012/0277992 A1 | 11/2012 | Pun | |
| 2014/0350851 A1 | 11/2014 | Carter et al. | |
| 2018/0009458 A1 | 1/2018 | Carter et al. | |

FOREIGN PATENT DOCUMENTS

| | | |
|---|---|---|
| DE | 20017771 U1 | 12/2000 |
| EP | 1863656 | 12/2007 |
| EP | 1869405 B1 | 10/2014 |
| GB | 2379804 A | 3/2003 |
| GB | 2391098 A | 1/2004 |
| WO | WO 98-44362 | 10/1998 |
| WO | WO 01/27891 A1 | 4/2001 |
| WO | WO 01/71372 A2 | 9/2001 |
| WO | WO 2004/031017 | 4/2004 |
| WO | WO 2005-118992 | 12/2005 |
| WO | WO 2006-102300 | 9/2006 |
| WO | WO 2006-102561 | 9/2006 |
| WO | WO 2007-025267 | 3/2007 |
| WO | WO-2005084155 A3 * | 8/2007 |
| WO | WO 2007-110571 | 10/2007 |
| WO | WO 2007-110572 | 10/2007 |
| WO | WO 2007-110573 | 10/2007 |
| WO | WO 2008-007050 | 1/2008 |

OTHER PUBLICATIONS

Press release titled "Purchek™—a Trolley-based Anti-theft Solution from Gatekeeper Garners Huge Attention at the 2005 Retail Middle East Exhibition," Apr. 28, 2005.

Press release titled "Gatekeeper Systems announces new product launch," Feb. 18, 2005.

Office Action in corresponding Canadian Application No. 2601569, dated Jan. 25, 2013, 2 pages.

(56) References Cited

OTHER PUBLICATIONS

Office Action in corresponding Canadian Application No. 2601569, dated Jan. 9, 2014, 2 pages.
Office Action in corresponding Canadian Application No. 2891641, dated Feb. 9, 2016, 3 pages.
Extended Search Report in corresponding European Application No. 06739105.2, dated Nov. 11, 2010, 8 pages.
Office Action in corresponding European Application No. 06739105.2, dated Dec. 8, 2011, 5 pages.
Invitation pursuant to Article 94(3) and Rule 71(1) EPC in corresponding European Application No. 06739105.2, dated Nov. 16, 2012, 3 pages.
International Search Report and Written Opinion for International Application No. PCT/US2006/010175, dated Sep. 21, 2007.

\* cited by examiner

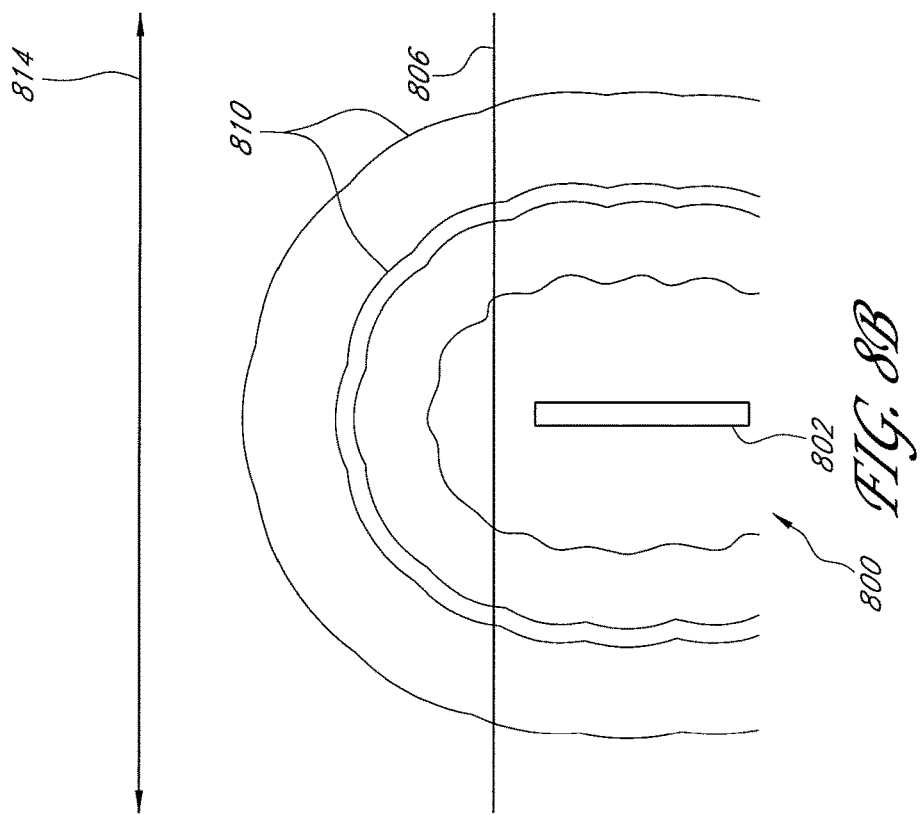
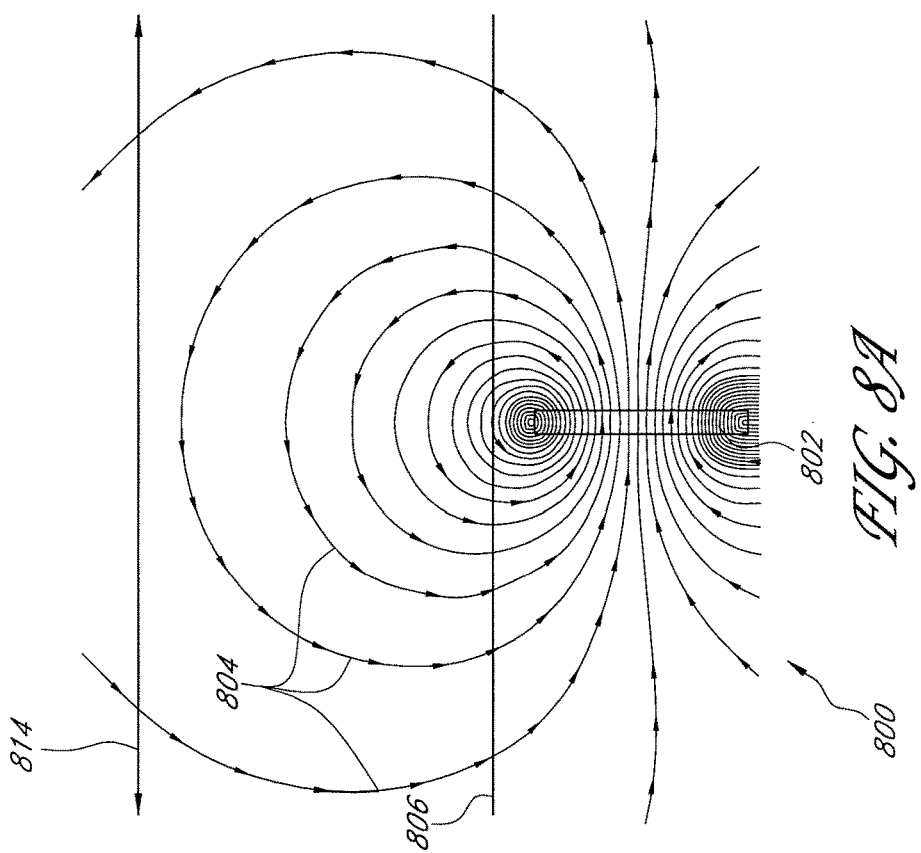

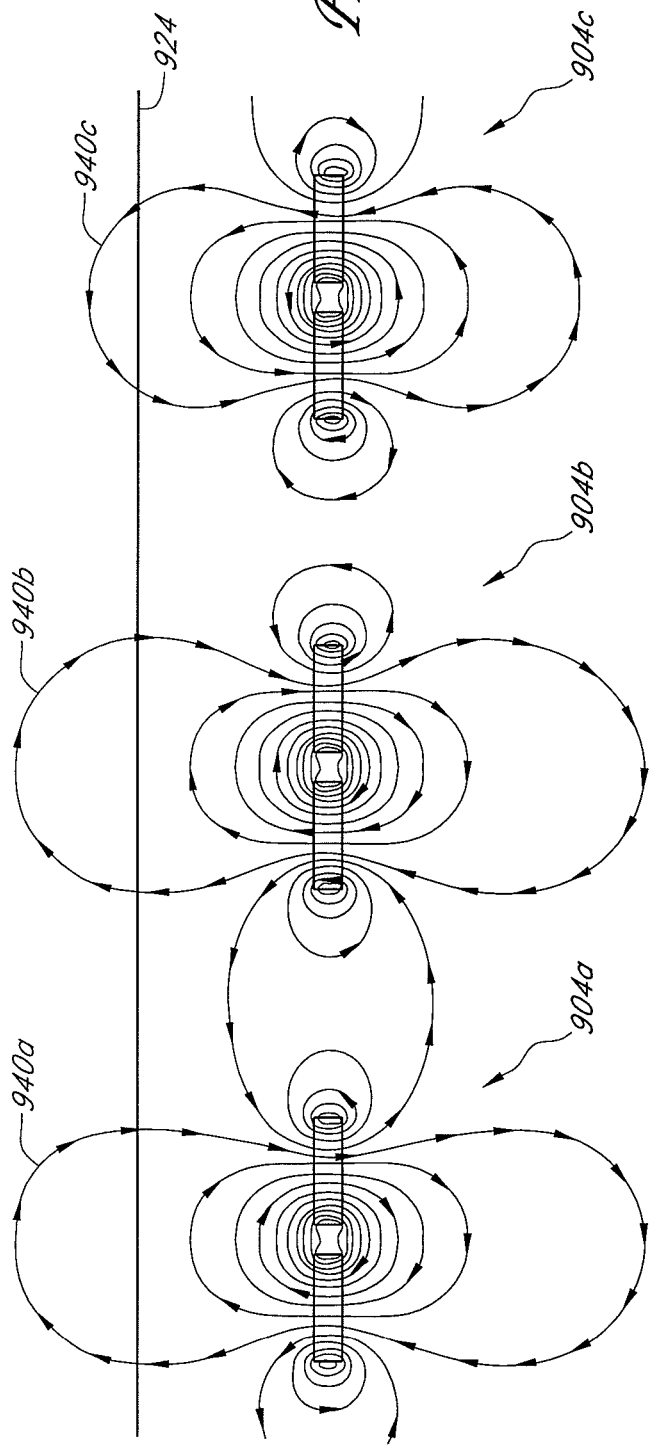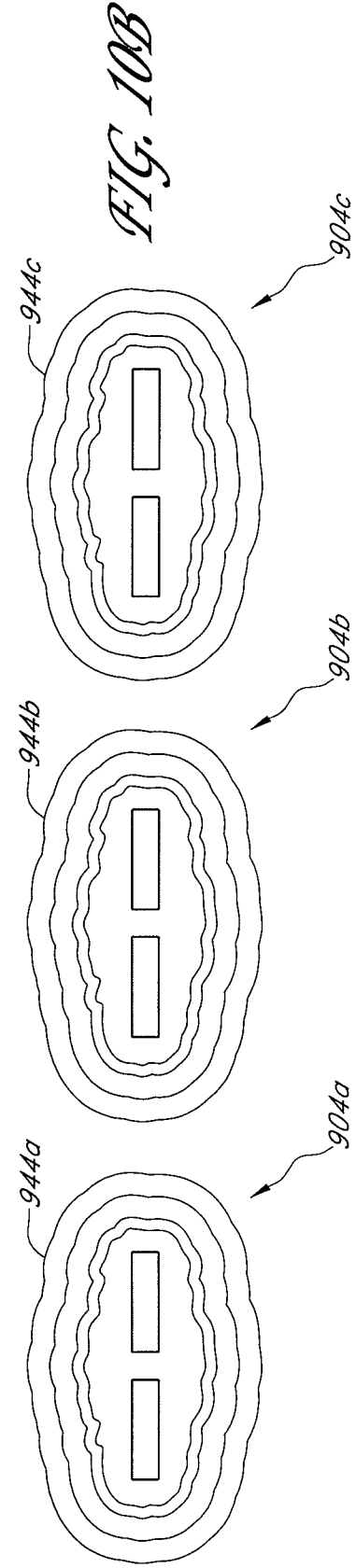

NAVIGATION SYSTEMS AND METHODS FOR WHEELED OBJECTS

CROSS-REFERENCE TO RELATED APPLICATIONS

This application is a continuation of U.S. patent application Ser. No. 14/299,957, filed Jun. 9, 2014, titled NAVIGATION SYSTEMS AND METHODS FOR WHEELED OBJECTS, now U.S. Pat. No. 9,630,639, which is a division of U.S. patent application Ser. No. 13/209,219, filed Aug. 12, 2011, titled NAVIGATION SYSTEMS AND METHODS FOR WHEELED OBJECTS, now U.S. Pat. No. 8,751,148, which is a division of U.S. patent application Ser. No. 11/277,027, filed Mar. 20, 2006, titled NAVIGATION SYSTEMS AND METHODS FOR WHEELED OBJECTS, now U.S. Pat. No. 8,046,160, which claims the benefit under 35 U.S.C. § 119(e) of U.S. Provisional Patent Application Nos. 60/663,147, 60/663,327, and 60/663,195, all filed on Mar. 18, 2005, the disclosures of all of the foregoing are hereby incorporated by reference. This application further incorporates by reference the following: U.S. patent application Ser. No. 11/277,029, filed Mar. 20, 2006, titled POWER GENERATION SYSTEMS AND METHODS FOR WHEELED OBJECTS (hereinafter "the Power Generation Patent Application"), now U.S. Pat. No. 8,820,447, and U.S. patent application Ser. No. 11/277,016, filed Mar. 20, 2006, titled TWO-WAY COMMUNICATION SYSTEM FOR TRACKING LOCATIONS AND STATUSES OF WHEELED VEHICLES (hereinafter "the Two-Way Communication Patent Application"), now U.S. Pat. No. 8,463,540.

BACKGROUND

Field

The present disclosure relates to determining the location of an object from its speed and direction of travel. More particularly, the present disclosure relates to determining the position of a wheeled object from measurements of the wheel's orientation and rotation.

Description of the Related Art

It is often desirable to track the position of an object as it moves throughout a tracking area. A facility such as, for example, a retail store, a hospital, an airport, or a warehouse, may wish to monitor the location of objects such as vehicles, carts, carriers, transports, and the like. The facility can use object location information, for example, to track inventory movements, to improve access to and retrieval of the objects, to identify clustering, queuing, or traffic patterns, and/or to prevent misplacement, loss, or theft of the objects. In one example, a retail store may wish to track the position of shopping carts so as to prevent the carts from being removed or stolen from a bounded area, such as a parking lot, or to ensure that a shopping cart has passed through a checkout lane before exiting the store. In another example, a facility may wish to map the architectural configuration of a building by using a wheeled object to measure positions of various landmarks.

A variety of methods have been used to determine the position of an object in a tracking area. For example, a radio frequency (RF) transmitter or tag can be attached to the object, and one or more receivers in the tracking area can monitor tag transmissions to determine object position. However, such methods are disadvantageous if the tracking area is large, which requires installation of many receivers, or if the tracking area contains structures that attenuate the tag transmissions. Other methods utilize the Global Positioning System (GPS) to determine position. However, GPS methods can fail if the GPS signal is blocked or if the visibility of satellites is interrupted. Further, both GPS systems and RF tag and receiver systems can be expensive and difficult to implement.

SUMMARY

A navigation system uses a dead reckoning method to estimate an object's present position relative to one or more prior positions. In some embodiments, the dead reckoning method determines a change in position from the object's heading and speed during an elapsed time interval. In embodiments suitable for use with wheeled objects, the dead reckoning method determines the change in position by measuring the heading and the amount of wheel rotation. In a preferred embodiment, the heading is determined with reference to the Earth's magnetic field by disposing magnetic sensors in or on the object. Error correction and position reset procedures may be implemented to reduce accumulated navigational error. In preferred embodiments, some or all of the navigation system is disposed within a wheel of the object. In certain embodiments, the navigation system determines whether the object has exited a confinement area and activates an anti-theft system such as an alarm or a wheel locking mechanism. The navigation system can be configured to communicate with external markers and/or RF transmitters. In some embodiments, the markers comprise magnetic elements arranged to produce a magnetic signal indicating a direction or other suitable information.

BRIEF DESCRIPTION OF THE DRAWINGS

These and other features of the invention(s) will now be described with reference to the following drawings illustrating certain preferred embodiments of the invention(s).

FIG. 8A schematically illustrates magnetic field lines associated with another embodiment of a magnetic marker.

FIG. 8B schematically illustrates contours of magnetic field strength associated with the magnetic marker of FIG. 8A.

FIG. 10A schematically illustrates magnetic field lines associated with the magnetic bar code marker shown in FIG. 9.

FIG. 10B schematically illustrates contours of magnetic field strength associated with the magnetic bar code marker shown in FIG. 9.

DETAILED DESCRIPTION OF CERTAIN PREFERRED EMBODIMENTS

I. Overview

Figure 1:
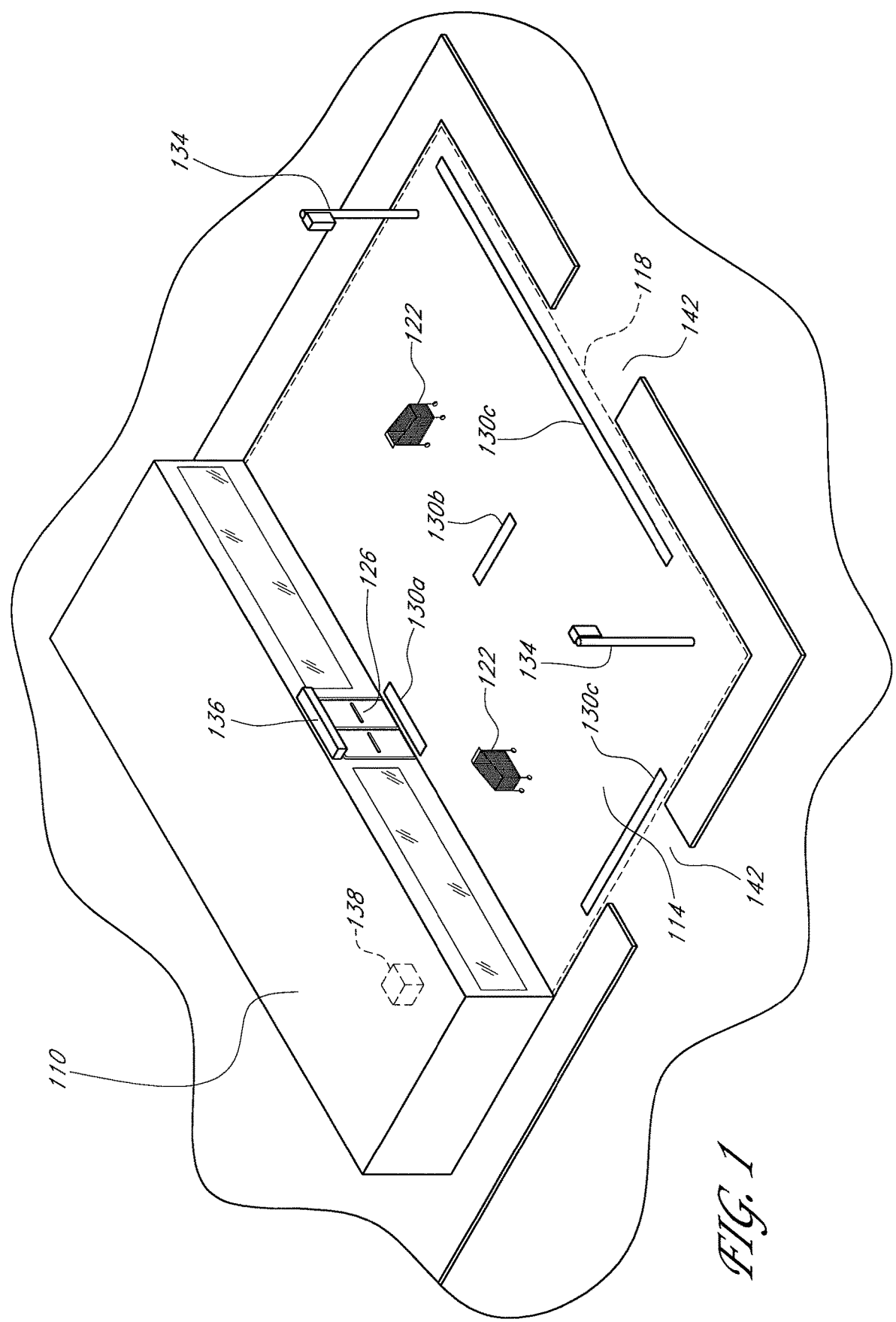
FIG. 1 is a perspective view of a retail store and associated property, illustrating components of a navigation system to reduce the theft of shopping carts from a parking lot.

Various embodiments of the present invention(s) provide reliable and inexpensive systems and methods for determining the position of an object in a tracking area. In certain embodiments, the object comprises a wheeled mechanical device. For example, the wheeled device may be a vehicle, a cart, a carrier, a conveyance, a transport, a gurney, a carriage, a wagon, a measuring wheel, or any other device comprising a wheel. In certain preferred embodiments, the wheeled device may be, for example, a shopping cart, a warehouse cart, an industrial cart, a luggage cart, or a baggage cart. In other preferred embodiments, the wheeled device may be, for example, a stretcher, a wheelchair, a walker, a hospital bed, a pharmacy cart, a stroller, or carts used for medical or other equipment.

In some embodiments of the disclosed system, the position of the object in the tracking area is determined by a navigation method commonly known as "dead reckoning." In a dead reckoning navigation system, the present position of the object is determined relative to one or more past positions of the object by estimating how far, and in what direction, the object has moved during an elapsed time interval. The past position may be a known reference location (commonly known as a "fix"), or it may be a prior position estimated by the dead reckoning method. By chaining together a sequence of dead reckoning positions, the path of the object as it moves may be determined.

In one example of this method, the object's position relative to a reference location is determined at an initial time, and its position after an elapsed time interval is estimated from the object's average speed and direction of travel ("heading"). By combining object speed, heading, and the elapsed time, the object's position can be updated. In some embodiments, the object's heading is determined by reference to the Earth's magnetic field by using a magnetic compass. In certain preferred embodiments, the object is a wheeled mechanical device. Under the assumption that the device's wheels do not slip, slide, or skid as the device moves, the device's speed may be estimated by determining the number of wheel rotations during an elapsed time interval.

Subsequent positions of the object can be estimated by dead reckoning from a prior position or positions. In some embodiments, if the object passes a known or reference location, the dead reckoning position is reset to the known or reference position in order to reduce error that has accumulated in the chain of dead reckoning steps. Known or reference locations can be communicated to the navigation system by various magnetic and/or electromagnetic methods as further described below.

In some embodiments, various features of the navigation system are implemented in components physically separate from the object (e.g., on a central controller or processor), which advantageously permits fewer components to be disposed in or on the object itself. Such embodiments, however, require a means for the object to communicate information such as heading and speed to the central controller. In some of these embodiments, information may be transmitted between the navigation system and the controller via a one-way or a two-way communication system. In other embodiments, the navigation system is implemented in or on the object itself, which advantageously permits the object's position to be determined autonomously. Such embodiments may be beneficial where it is desired for the object to perform an action, such as triggering an alarm or setting a locking brake, without intervention from an external component or system.

II. Example Scenario

For purposes of illustration, a sample scenario in which an embodiment of the navigation systems and methods disclosed herein may be used will be presented with reference to FIG. 1. This sample scenario is intended to facilitate understanding of one embodiment and is not intended to limit the scope of the inventions disclosed and claimed.

In the sample scenario shown in FIG. 1, the navigation system is used as part of a loss prevention system by a retail store 110 to reduce the theft of shopping carts 122 from a tracking area 114. The tracking area 114 may comprise, for example, a portion of a parking lot adjacent to the store 110. An objective of the loss prevention system is to prevent, or at least reduce, the unauthorized transport of carts 122 across a boundary (or perimeter) 118 of the lot 114. In one embodiment of the loss prevention system, each cart 122 may include an anti-theft system comprising, for example, an alarm or a mechanism to inhibit motion of the cart 122. Cart motion can be inhibited by providing at least one wheel of the cart 122 with a brake mechanism configured to lock the wheel such as, for example, the brake mechanism disclosed in U.S. Pat. No. 6,945,366, issued Sep. 20, 2005, titled "ANTI-THEFT VEHICLE SYSTEM," which is hereby incorporated by reference herein in its entirety. In other embodiments, cart motion can be inhibited by other mechanisms, as is well known in the art.

To prevent loss, if the cart 122 is moved across the lot boundary 118, the anti-theft system is activated (e.g., the alarm or the brake is triggered). In some loss prevention systems, the anti-theft system is activated if the cart 122 detects a signal from an external transmitter positioned near the lot boundary 118. For example, the signal may be a VLF signal transmitted from a wire buried at the boundary 118, such as described in U.S. Pat. No. 6,127,927, issued Oct. 3, 2000, titled "ANTI-THEFT VEHICLE SYSTEM," which is hereby incorporated by reference herein in its entirety. Such loss prevention systems require external components (e.g., the buried wire) to be installed.

The navigation system disclosed herein may advantageously be used in conjunction with a loss prevention system, because the navigation system autonomously enables the position of the cart 122 to be determined. If the navigation system determines the position of the cart 122 to be outside the lot boundary 118, the anti-theft system can be activated. In one embodiment, the navigation system begins to monitor cart position when the cart 122 leaves a store exit 126. The initial cart position is set to be the position of the exit, and the navigation system updates the position of the cart 122 as it moves throughout the lot 114. In some embodiments, the navigation system is provided with the position of the lot boundary 118, for example, as a set of coordinates. By comparing the present position of the cart 122 with the position of the boundary 118, the system can determine whether the cart 122 is within the lot 114. If the navigation system determines the cart 122 is moving across the lot boundary 118, the navigation system can activate the cart's anti-theft system.

In other embodiments, the navigation system communicates the position of the cart 122, or other information, to a central processor or controller 138, which determines whether the cart 122 has exited the lot 114 and whether the anti-theft system should be activated. In certain preferred embodiments, the cart 122 comprises a two-way communication system that enables suitable information to be communicated between the cart 122 and the central controller 138 (or other suitable transceivers). A two-way communication system suitable for use with the navigation system is further discussed in the Two-Way Communication Patent Application.

Other devices and components can be advantageously used by the retail store 110 in this sample scenario. For example, one or more markers 130a-130c can be disposed at various locations throughout the lot 114 to serve as reference locations, landmarks, or beacons. The markers 130a-130c can mark or otherwise indicate the position of, for example, store exits 126 (e.g., marker 130a), the perimeter of the lot 114 (e.g., markers 130c), and/or other suitable reference locations (e.g., marker 130b). In various embodiments, the markers 130a-130c communicate information to the navigation system by, for example, magnetic methods (or other electromagnetic methods) as further discussed below. The navigation system may use information from a marker 130a-130c to reset the cart's position (e.g., to reduce accumulated dead reckoning errors), to determine that a lot boundary 118 is nearby, or for other purposes. In some embodiments, one or more markers (such as the markers 130c) may be disposed near locations of entrances/exits 142 to the parking lot 114.

In certain embodiments, the markers 130a-130c are configured to indicate a reference direction or other information. For example, the marker 130a may be positioned at the exit 126 and oriented so that its reference direction points outward, toward the lot 114. The navigation system can detect the reference direction and determine whether the cart is entering or exiting the store 110. Similarly, the markers 130c can indicate an outward direction at the perimeter 118 of the lot 114. In some embodiments, some or all of the markers 130a-130c can be configured to communicate other types of information to the navigation system as further described below.

In one embodiment, one or more transmitters 134 are disposed throughout the lot 114 and configured to transmit information to the navigation system in the carts 122. The transmitters 134, in an embodiment, also receive information (e.g., they are transceivers). In various embodiments, the markers 130a-130c (the transmitters 134 and/or the access points 136) communicate with the carts 122 via one-way (to or from the cart) or two-way (to and from the cart) communication protocols. For example, the markers 130, transmitters 134, and/or access points 136 may be configured to use electromagnetic signals to communicate with the cart 122. These signals may include magnetic signals and/or RF or VLF signals. As used herein, RF signals comprise electromagnetic signals having frequencies below about 300 GHz, and VLF ("very low frequency") signals comprise RF signals having frequencies below about 20 kHz.

In other embodiments, one or more access points (AP) 136 are used to create two-way communication links with the carts 122. In FIG. 1, the access point 136 is shown positioned above the exit 126 of the store 110, which beneficially allows the AP to communicate with carts 122 located throughout the parking lot 114. In other implementations, more than one AP can be used, and the AP's can be located throughout the tracking area. Access points 136 can communicate with a transceiver in the cart 122 (e.g., an RF transceiver), which is connected to the navigation system (and/or other components) for purposes of retrieving, exchanging, and/or generating cart status information, including information indicative or reflective of cart position. The types of cart status information that may be retrieved and monitored include, for example, whether an anti-theft system has been activated (e.g., whether a wheel brake is locked or unlocked); whether the cart 122 is moving and in which direction; the wheel's average speed; whether the cart 122 has detected a particular type of location-dependent signal such as a VLF, EAS, RF, or magnetic signal (discussed below); whether the cart is skidding; the cart's power level; and the number of lock/unlock cycles experienced by the cart per unit time. The access points 136 can also exchange information with the navigation system related to the position of the perimeter 118. In some embodiments, the cart 122 uses a received signal strength indicator (RSSI) to measure the strength of the signal received from the access points 136 to assist in determining the distance from the cart 122 to the access points 136 and whether the cart is moving toward or away from the store 110. In other embodiments, the access points 136 use an RSSI to measure the strength of the signal received from the carts 122 to determine the location and motion of the carts 122. Further details on the implementation and use of a set of wireless access points (AP) is disclosed in the Two-Way Communication Patent Application.

The navigation system may be used by the store 110 for purposes additional to or different from loss prevention. In some embodiments, the retail store 110 may wish to gather information related to the positions and paths taken by the carts 122. For example, the retail store may wish to determine where in the lot 114 that customers leave carts 122 so as to improve cart retrieval operations. In other embodiments, the navigation system can communicate with other devices such as, for example, a mechanized cart retrieval unit.

Although the sample scenario has been described with reference to a loss prevention system for shopping carts 122 in a parking lot 114 outside a retail store 110, in some embodiments, the navigation system is configured to determine the position of a cart 122 within the store 110. For example, the system may be used to determine whether a cart 122 has passed through a checkout lane or whether the cart 122 has passed through selected aisles. In addition, the navigation system may be used to track cart positions so as to gather information related to the clustering or queuing of carts at certain locations inside or outside the store 110. Many uses are possible for the navigation system, and the discussion of the sample scenario herein is not intended to be limiting.

In some embodiments, the navigation system is disposed in or on the cart 122, while in other embodiments, some of the functions of the navigation system are carried out by components remote from the cart 122 (e.g., the central controller 138). In a preferred embodiment, the navigation system is sized so as to fit within a wheel of the cart 122. In certain such preferred embodiments, the wheel is a shopping cart wheel (either a front wheel or a rear wheel). In some embodiments, the wheel has a diameter of about five inches, while in other embodiments, the diameter of the wheel is less than about five inches or greater than about five inches. In other embodiments, portions of the navigation system can be disposed in one (or more) of the object's wheels, while other portions can be disposed elsewhere in the cart 122, for example, in a wheel assembly attaching the wheel to the cart 122 (e.g., a caster or a fork), or in another location in or on the cart 122 (e.g., in the handlebars or the frame).

The navigation system can be powered by a variety of sources. For example, the navigation system may use electrochemical sources (e.g., disposable or rechargeable batteries), photovoltaic power sources (e.g., a solar cell), fuel cells, mechanical power sources, or any other suitable source. In some embodiments, the navigation system is powered by a generator that stores a portion of the wheel's rotational kinetic energy as electrical energy such as, for example, the wheel generator disclosed in the Power Generation Patent Application.

The power source may be integral with or remote from the navigation system. For example, in embodiments where the system is disposed in a wheel, the power source may be disposed in the wheel and/or elsewhere in or on the cart 122 (e.g., in the wheel assembly, the handlebars, or the frame). In some embodiments, such as those facilitating a loss prevention system, the navigation system is activated only when a cart 122 has exited the store 110 so as to prevent power loss while the cart 122 is located within the store 110, where theft is less likely.

Embodiments of the navigation systems and methods may be used in other environments and contexts such as, for example, a warehouse, an industrial plant, an office building, an airport, a hospital, or other facility. Additionally, embodiments of the navigation system and methods are not limited to use with shopping carts but are intended to be used with any other moveable objects and particularly with any other wheeled objects. Many variations of the sample scenario discussed above are possible without departing from the scope of the principles disclosed herein.

III. Navigation System

Figure 2A:
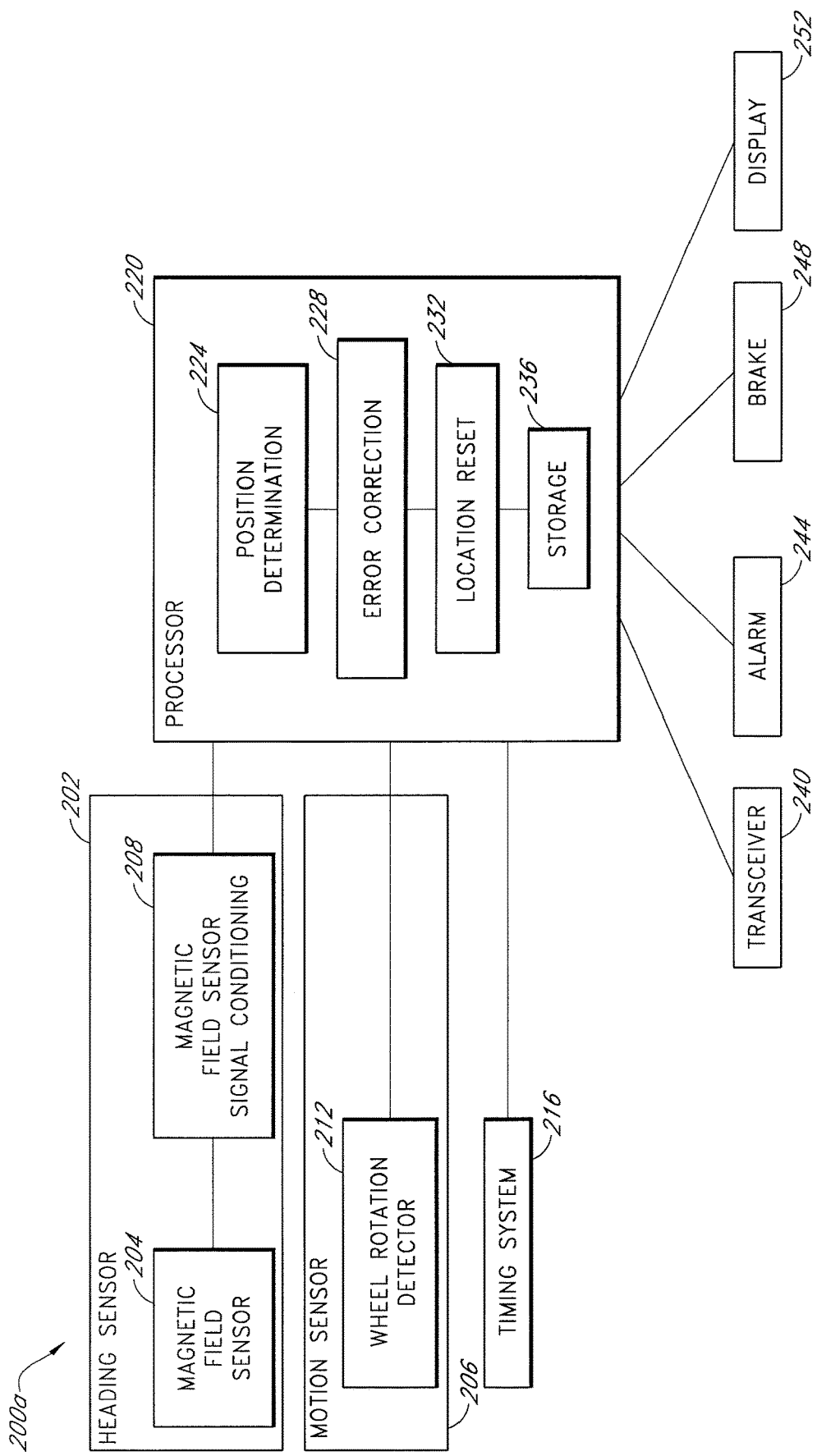
FIG. 2A is a block diagram of one embodiment of a navigation system for determining the position of a wheeled object.

FIG. 2A is a schematic diagram of one embodiment of a navigation system 200a for determining the position of a wheeled object. In this embodiment, the navigation system 200a implements a dead reckoning algorithm using object heading, speed (or distance traveled), and elapsed time to update the position of the object. The navigation system 200a comprises a heading sensor 202, a motion sensor 206, a timing system 216, and a processor 220. The processor 220 is configured to determine the object's position from information communicated from the sensors and to output signals to suitable devices such as, for example, a transceiver 240, an alarm 244, a wheel brake 248, and/or a display 252.

To facilitate understanding of one embodiment of the navigation system 200a, FIG. 2A schematically illustrates the components of the system (e.g., the heading sensor 202, the motion sensor 206, the timing system 216, and the processor 220) as being separate components or modules. This, however, is not a requirement of the navigation system 200a, and other embodiments may configure the system 200a differently. For example, fewer or more components may be used, and some or all of the functions carried out by the various components may be performed by additional or different components. Also, other embodiments of the navigation system 200a need not implement each of the functions and features described, nor achieve each of the advantages described. In some embodiments, the components are not separate devices or subsystems but are configured to be integral. For example, in one embodiment, the heading sensor 202 and the motion sensor 206 send raw signals to the processor 220, which performs all subsequent data processing calculations. It is appreciated that many variations of the navigation system 200a are possible.

a. Heading Sensor

The heading sensor 202 determines the direction of motion of the object. In certain embodiments, the heading sensor 202 functions as a magnetic compass that measures heading with respect to the Earth's magnetic field. In certain such embodiments, the object's heading is determined as the angle between the direction of the object's motion and the direction to the local geomagnetic North pole. Accordingly, in some embodiments, the heading sensor 202 comprises a magnetic field sensor 204 that detects the local magnetic field at the position of the object.

As is well known, magnetic fields are vectors, having both a magnitude and a direction. Vectors can equivalently be described as having three independent components. Vectors are commonly denoted by boldface letters so that the Earth's magnetic field will be denoted herein by the symbol $B_0$. The magnetic field measured by the magnetic sensors 204 will be denoted by the symbol B. It is generally expected that the primary contribution to the measured magnetic field will come from the Earth's field, namely, $B \approx B_0$.

In certain embodiments, it is convenient to describe vectors, such as a magnetic field, in terms of two mutually perpendicular components lying in the plane of the object's motion and one component perpendicular to that plane. In some embodiments, the magnetic field sensor 204 comprises a two-axis magnetic field sensor that is capable of measuring the value of the two magnetic field components in the object's plane of motion. In other preferred embodiments, the magnetic sensor 204 comprises a three-axis magnetic field sensor that measures each of the three independent magnetic field components. In yet other embodiments, the magnetic sensor 204 comprises a "2½"-axis sensor that can measure two magnetic field components and the algebraic sign of a third component. Other sensor variations are possible; for example, in one embodiment the magnetic sensor 204 measures a magnetic field component in the direction of the object's motion and a component perpendicular to this direction but out of the plane of motion (e.g., by about 45 degrees). In some embodiments, a single magnetic sensor 204 is used, while in other preferred embodiments, two or more magnetic sensors 204 are used.

In embodiments using three-axis magnetic sensors, the navigation accuracy generally is improved, because the three-axis sensor can be used to reject spurious magnetic field measurements that are not indicative of the local geomagnetic field and which can give false headings.

The magnetic sensors 204 can be configured in many ways. For example, a three-axis sensor may comprise three single-axis sensors, or a two-axis sensor together with a single axis sensor. In other embodiments, an integrated three-axis sensor may be used. Similar considerations apply to two- and 2½-axis sensors, and it is recognized that many possible sensor configurations and designs can be selected by a skilled artisan.

Many types of magnetic sensors 204 are suitable for use with the navigation system 200a. Various embodiments utilize, for example, inductive sensors, magnetoresistive (MR) sensors, Hall effect sensors, search coils, flux gate sensors, and/or microelectromechanical systems (MEMS) magnetic sensors. In certain preferred embodiments, the magnetic sensor 204 comprises a thin-film solid state sensor such as an anisotropic magnetoresistance (AMR) sensor and/or a giant magnetoresistance (GMR) sensor. In one embodiment, the magnetic sensor 204 comprises a Honeywell HMC-1052L two-axis AMR sensor (Honeywell Inc., Morris Township, N.J.) for x- and z-component magnetic field measurements and a Honeywell HMC1041Z one-axis AMR sensor for y-component measurements. The magnetic sensor 204 can provide analog or digital output. In some embodiments, the magnetic sensor 204 comprises a magneto-inductive sensor, for example, a PNI SEN-S65 magneto-inductive sensor (PNI Corp., Santa Rosa, Calif.).

It is preferable, although not necessary, for the magnetic sensor 204 to have small size, low power consumption, and to be sensitive to geomagnetic field strengths. For example, in some embodiments, the magnetic sensors 204 are responsive to a range from a lower limit of about 1 milliGauss to an upper limit of about 10 Gauss. In other embodiments, a suitable upper limit is about 3 to 4 Gauss, while in yet other embodiments, an upper limit is about 0.6 Gauss. Further, it is also preferable, but not necessary, for the magnetic sensor 204 to be operable at sufficiently high frequencies so that the heading sensor 202 can accurately track changes in the object's direction of motion. For example, embodiments of magnetic sensors 202 used in shopping carts may operate at frequencies up to about 250 Hz, particularly those embodiments that filter ambient AC electromagnetic fields as described further below.

The magnetic field sensor 204 detects the local magnetic field at the position of the object, B, which may include magnetic field contributions in addition to the Earth's magnetic field $B_0$. Such extraneous magnetic fields may come from, for example, magnets disposed in the object itself, such as magnets in motors, actuators, generators, etc., or from the magnetization of metals within the object, such as the metal frame of a cart. Other sources of extraneous magnetic fields are external to the object, such as buried metal plates, AC power lines, nearby metal objects such as other carts, automobiles, etc.

In embodiments suitable for use with wheeled objects, the heading sensor 202 may be disposed within one (or more) of the object's wheels. In other embodiments, the heading sensor 202 is disposed in or on other locations on the object, such as a wheel assembly (e.g., a fork or a caster) or the frame or the handlebars. Portions of the heading sensor 202 can be distributed in the object. In a preferred embodiment, one or more of the magnetic sensors 204 are disposed in a wheel of the object. However, this not a requirement, and in other embodiments the magnetic sensors 204 can be disposed in other locations (e.g., the wheel assembly, the frame, and/or the handlebars) or distributed in the object. For example, a two-axis x-y magnetic sensor 204 may be disposed in one location, while a z-axis magnetic sensor is disposed in another location. A skilled artisan will recognize that many variations are possible without departing from the scope of the principles disclosed herein.

The heading sensor 202 may comprise a magnetic sensor signal conditioning module 208, which can be used, for example, to detect and correct errors in the magnetic field measurements taken by the magnetic sensors 204. In an embodiment, the signal conditioning module 208 can also perform corrections to remove the effects of extraneous magnetic fields to provide a better estimate of the geomagnetic field. The signal conditioning module 208 may be a separate component or module or it may be integrated into other parts of the navigation system. The signal conditioning module 208 may perform its functions in hardware, software, and/or firmware. In the embodiment shown in FIG. 2A, the signal conditioning module 208 is integrated with the heading sensor; however, in other embodiments, some or all of the functions of the signal conditioning module 208 are performed by other components such as, for example, the processor 220 or a central controller. In some embodiments, some or all of the functions of the signal conditioning module 208 are performed by the magnetic sensors 204. Many variations are possible.

In some embodiments, the signal conditioning is performed on an analog signal received from the magnetic field sensor 204. In other embodiments, the signal conditioning module 208 includes an analog-to-digital converter (ADC) that converts an analog input signal from the magnetic sensor 204 (e.g., a voltage) into a sampled digital signal that can be further conditioned.

The signal conditioning module 208 may, for example, amplify, digitize, filter, multiplex, synchronize, and/or otherwise process the magnetic sensor 204 signals. Since the Earth's magnetic field is substantially stationary on timescales of interest, in some embodiments the signal conditioning module 208 low-pass filters the signals from the sensors 204 prior to further processing. In one embodiment, the low-pass filter is configured to have a cutoff frequency of a few Hz. Magnetic sensor 204 signals may be synchronized, with each other or with other signals in the system 200a, by reference to a master system time provided by a timing system 216.

In certain embodiments, the sensor signal conditioning module 208 corrects for errors in the magnetic field measurements taken by the magnetic sensors 204. Such errors may come from sources such as random or systematic noise and/or extraneous magnetic or electromagnetic fields.

Certain embodiments of the signal conditioning module 208 correct for the presence of an external magnetic field, $B_{ext}$, by subtracting this quantity from the measured field B to obtain an estimate for the geomagnetic field: $B_0 \approx B - B_{ext}$. In these embodiments, an estimate of the external field must be provided to the navigation system 200a. Therefore, if a component, such as a motor having internal magnets, is replaced, an new estimate for the external field of the replacement component must be provided. In other embodiments, a more sophisticated model, such as a lookup table using interpolation, is used to correct for external magnetic fields. The correction for the presence of external fields may be performed by the magnetic sensor signal conditioning module 208, by the processor 220, or by some other suitable component of the navigation system 200a.

In certain embodiments, the presence of external fields in the vicinity of the magnetic sensors 204 is reduced by disposing one or more magnetic flux concentrators or flux shields around magnetic components (e.g., on-board motors) that potentially contribute extraneous fields to the magnetic sensors 204. A flux concentrator or shield may comprise one or more materials having a high magnetic permeability such as, for example, Mumetal® (Magnetic Shield Corp., Bensenville, Ill.), Permalloy® (B&D Industrial Mining Services, Inc., Jasper, Ala.), cold-rolled steel (possibly with corrosion resistant plating), mild steel, metallic alloys, and/or other suitable materials. Alternatively, motor designs having low magnetic flux leakage may be selected in some embodiments.

In some embodiments, the magnetic sensor conditioning module 208 is configured to correct for extraneous fluctuations in the measured magnetic field strength. Such fluctuations may be caused by random measurement noise, the presence of time-varying magnetic fields from AC power sources, or from vibrations or oscillations in the heading sensor 202. For example, in embodiments wherein the wheeled object comprises a castered wheel, chatter or shimmy of the wheel can cause a magnetic sensor 204 disposed in the wheel to oscillate about the direction of motion. Accordingly, variations in the magnetic field detected by the sensor 204 may reflect wheel chatter or shimmy rather than heading variations.

Artificial fluctuations in the field components detected by the magnetic sensors 204 can be reduced using a number of techniques. For example, the signal conditioning module 208 can low pass filter the sensor 204 signals. The filter may comprise an analog and/or a digital filter. In certain embodiments, a finite impulse response (FIR) filter and/or an infinite impulse response (IIR) can be used to filter digital signals. One embodiment utilizes a moving average (e.g., a boxcar average) applied to a number of the past measurements, such as, for example, 2, 4, 8, 10, 20, 40, or 100 measurements. Other embodiments apply a type of "optimal" filter such as, for example, a Wiener or a Kalman filter, to remove noise or other high frequency artifacts from the sensor signals.

Stray alternating current (AC) electromagnetic fields from, for example, AC power lines, leaking fluorescent light ballasts, etc., may cause artificial fluctuations in the measured magnetic field components to occur at the AC frequency (generally, 50 Hz or 60 Hz). In some embodiments, the signal conditioning module 208 includes a notch filter with a stopband at about 50 Hz or 60 Hz to reduce the effects of stray AC fields. In some embodiments, the sampling frequency of the magnetic sensor 204 is adjusted so that computationally efficient notch filter algorithms can be used. For example, some notch filter algorithms are particularly efficient if the sampling rate is four times the frequency to be rejected. Accordingly, some embodiments of the magnetic field sensor 204 sample at a rate of 200 Hz or 240 Hz, depending on whether the local AC frequency is 50 Hz or 60 Hz, respectively. Sampling at four times the AC frequency also beneficially provides reasonable rejection of 100 Hz and 120 Hz components produced by fluorescent lights. In a preferred embodiment, the sampling rate is 480 Hz to provide strong rejection of fluorescent light signals. However, since sampling at such frequencies can require extra power consumption, other embodiments sample the magnetic field at a rate of 100 or 120 Hz and then average every two samples to cancel out any stray linear 50 Hz or 60 Hz components.

In certain embodiments, such as tracking the position of a shopping cart as it leaves a store, the local magnetic field measured by the object may significantly depart from the geomagnetic field due to the presence of nearby magnetic materials. For example, the steel frame of a doorway and the surrounding building materials may cause a deviation in the magnitude and direction of the local field that will cause errors in the inferred heading taken by the object. Automobiles and magnetic metals buried in a parking lot can also lead to local field deviations. Some embodiments of the system 200a correct for such deviations, for example, by storing a lookup table containing corrections to the magnetic field. Other embodiments reject field measurements that deviate significantly from the Earth's field or correct them by a suitable averaging procedure. In certain embodiments, after a shopping cart exits a store, the navigation system waits for a specified time interval or for the cart to have traveled a specified distance before beginning to navigate. In certain such embodiments, the navigation system assumes the cart moves in a straight line from the store exit until the navigation system begins to track the cart position.

The signal conditioning module 208 can be configured to reduce the effects of other processes that prevent accurate magnetic field measurements from being taken. For example, if AMR detectors are used as magnetic field sensors 204, some embodiments of the signal conditioning module 208 correct for errors in field strength measurements caused by cross-field effects, as is well known in the art.

After correcting magnetic sensor 204 measurements for errors, artificial fluctuations, and/or extraneous fields so as to arrive at an improved estimate of the Earth's magnetic field, some embodiments of the signal conditioning module 208 (or the processor 220 or a system controller) provide a further check on whether the estimated field is a reliable measure of the geomagnetic field. For example, one embodiment makes a comparison of the magnitude of the estimated geomagnetic field to the magnitude of the known value $|B_0|$. If the compared values do not agree (to within an error tolerance), the estimated field measurements are rejected. Other embodiments similarly test the estimated field against other known attributes of the true geomagnetic field, such as, the geomagnetic inclination (the field's angle with respect to a horizontal plane).

Other corrections are possible. For example, some embodiments of the navigation system 200a comprise one or more orientation sensors configured to determine whether, and by how much, the object is inclined with respect to the local gravitational field. The orientation sensors may comprise inclinometers and/or accelerometers. By determining the orientation of the object, such embodiments can use standard trigonometric calculations to transform the magnetic field measurements from an object-based coordinate system to an Earth-based coordinate system.

Information from the heading sensor 202 can be used for other purposes besides dead reckoning. For example, an anti-theft system in a cart may signal a wheel brake to engage and lock if the shopping cart exits a confinement perimeter (e.g., the perimeter of a parking lot). Further movement of the cart across the parking lot causes the locked wheel to skid, which results in significant frictional wear on a bottom portion of the wheel. If dragged a significant distance, the locked wheel may be damaged (e.g., its tire tread significantly worn down) and may require replacement, causing extra expense. Accordingly, some embodiments of the heading sensor 202 are configured to detect whether a locked wheel is being dragged, for example, by measuring vibration of the wheel. The wheel's vibration causes the heading measurements (and/or the magnetic field component measurements) to fluctuate at a frequency of the wheel vibration. The processor 220 can monitor the heading information to determine whether a locked wheel exhibits such a vibration signature. In certain embodiments, the system may also comprise a vibration sensor to assist in detecting the wheel vibration signature. A suitable vibration sensor is disclosed in the Two-Way Communication Patent Application. In some embodiments, if the vibration signature of a locked wheel is detected, the processor 220 next checks the heading of the wheel to determine if it is being dragged back toward the facility. If so, the processor 220 may signal the anti-theft system to unlock the wheel, under the assumption that the cart is being returned to the store rather than being stolen. In some embodiments, the wheel is unlocked only if the object has been dragged a predetermined distance back toward the facility.

In some embodiments, the access point 136 (AP) may use RSSI to measure the strength of a signal received from the navigation system 200a so as to infer a distance to the wheel. The change is signal strength can be used to determine whether the locked wheel is being dragged toward or away from the facility. In these embodiments, the AP 136 may communicate a signal to the navigation system 200a (and/or the anti-theft system) to unlock the wheel.

Although the heading sensor 202 described with reference to FIG. 2A comprises one or more magnetic sensors 204, other embodiments of the heading sensor 202 can determine the direction of travel by other means. For example, in some embodiments, the navigation system 200a uses one or more accelerometers to determine the deviation of the object from a straight-line path. In an embodiment disposed on an object with a castered (e.g., swiveled) wheel, the navigation system uses rotational encoders coupled to the castered axis to determine the heading of the wheel. Other embodiments may use a combination of magnetic, acceleration, or rotation sensors to determine heading. Other variations are possible, and the above disclosure is not intended as a limitation on devices and methods used to determine heading.

b. Motion Sensor

The navigation system 200a schematically illustrated in FIG. 2A comprises a motion sensor 206 that determines the movement of the object. In some embodiments, the motion sensor 206 comprises a speed sensor that measures the speed of the object over a short time interval. In other embodiments, the motion sensor 206 comprises a distance sensor that measures a distance over which the object moves. Certain embodiments may comprise both a speed sensor and a distance sensor to improve accuracy and reliability. The motion sensor 206 may be coupled to the timing system 216 in order, for example, to determine elapsed time intervals and/or to synchronize the motion measurements with heading measurements. The motion sensor 206 communicates a signal corresponding to the object's speed or distance traveled to the processor 220 wherein it is combined with heading information from the heading sensor 202 to determine the position of the object.

Many types of motion sensors 206 are suitable for use with the navigation system 200a. For example, the motion sensor 206 can comprise a speedometer, an odometer, a tachometer, and/or other suitable movement detector. The motion sensor 206 may utilize mechanical, optical, and/or electromagnetic components to detect and measure the object's motion. In some embodiments, the motion sensor 206 includes processing circuitry to calculate, for example, speed or distance, while in other embodiments, the motion sensor 206 communicates raw signals to the processor 220 for subsequent motion determination calculations. In certain embodiments, the motion sensor 206 includes a signal conditioning module (not shown in FIG. 2A) that performs functions analogous to those described above with reference to the magnetic sensor signal conditioning module 208. Although FIG. 2A schematically shows the motion sensor 206 as being a separate component in the navigation system 200a, this is not a requirement, and in other embodiments the motion sensor 206 is integrated with other system components such as, for example, the heading sensor 202.

In certain embodiments, the navigation system 200a is configured to be used with a wheeled object such as, for example, a vehicle, a cart, a transport, a measuring wheel, etc. In these embodiments, the motion sensor 206 may be configured to detect the rotation of one or more wheels attached to the object so as to determine the speed and/or distance traveled by the object. In the embodiment schematically illustrated in FIG. 2A, the motion sensor comprises a wheel rotation sensor 212, which can detect and/or measure the presence and/or the amount of wheel rotation. The wheel rotation sensor 212 communicates one or more signals indicative of wheel rotation to the processor 220. In some embodiments, the wheel rotation sensor 212 comprises processing circuitry to convert a measurement of wheel rotation into a speed and/or a distance, while in other embodiments, the rotation sensor 212 communicates a raw signal to the processor 220, which combines the raw signal with other information to determine speed and/or distance.

In various embodiments, the wheel rotation sensor 212 comprises a mechanical, optical, and/or electromagnetic device configured to sense the movement or rotation of the wheel. Many varieties of rotation sensor are known in the art and can be configured for use with the motion sensor 206. For example, the rotation sensor 212 can comprise one or more widely available incremental or absolute rotary encoders that detect wheel rotation. In one embodiment, the wheel rotation sensor 212 comprises one or more optical encoders, which may use a light source and a light detector separated by an element that is partially transparent and partially opaque to detect rotation. In other embodiments, the wheel rotation sensor 212 comprises one or more magnetic encoders such as, for example, a Hall effect sensor configured to detect the rotation of one or more magnets attached to a rotating portion of the wheel. In embodiments utilizing magnetic rotation detectors, it is preferred, but not necessary, for the magnetic encoder to be magnetically shielded so that extraneous magnetic field is not detected by the magnetic field sensor 204.

In certain embodiments, the wheel rotation sensor 212 comprises a mechanical or electromechanical system comprising one or more bumps or cams rotating with the wheel and configured to trip, compress, or otherwise trigger a non-rotating switch or sensor. The switch or sensor may be a mechanical or electrical switch. In some embodiments, the sensor is a piezoelectric element that generates an electrical signal (e.g., a voltage) when compressed by a bump or cam. In certain embodiments, more than one bump or cam may be used. In certain preferred embodiments, N substantially equally spaced bumps are disposed about a circumference of the wheel so that in one complete revolution the switch or sensor is triggered N times, thereby providing rotational sensitivity of about $2\pi/N$ radians. In various embodiments, the number N may be, for example, 1, 2, 3, 4, 8, 16, or some other suitable number. Such rotation detectors may be advantageously used with certain embodiments of the dead reckoning system disclosed herein [e.g., see the discussion with reference to Eqs. (6) and (7)].

Other embodiments of the rotation sensor 212 operate in an analogous fashion but may use notches, grooves, detents, protrusions, etc. in addition to or instead of one or more bumps or cams. Moreover, other embodiments may dispose the switch or sensor on a rotating portion of the wheel and dispose a bump, cam, etc. on a non-rotating wheel portion. It is appreciated that there are many mechanical configurations that can be used to detect wheel rotation.

In embodiments suitable for use with wheeled objects, the motion sensor 206 may be disposed within one (or more) of the object's wheels. In other embodiments, the motion sensor 206 is disposed in or on other locations on the object, such as a wheel assembly (e.g., a fork or a caster) or the frame or the handlebars. Portions of the motion sensor 206 can be distributed in the object. In a preferred embodiment, one or more of the wheel rotation sensors 212 are disposed in at least one wheel of the object. In certain embodiments, a wheel rotation sensor 212 is disposed in more than one wheel so as to provide more accurate and reliable motion sensing. However, this not a requirement, and in other embodiments the motion sensors 204 can be disposed in other locations (e.g., the wheel assembly, the frame, and/or the handlebars) or distributed in the object. A skilled artisan will recognize that many variations are possible without departing from the scope of the principles disclosed herein.

In certain embodiments, the wheel comprises a power generator that produces electrical energy from the rotational kinetic energy of the wheel. A suitable power generator is disclosed in the Power Generation Patent Application. The power generator can be used to supply power to some or all of the navigation system 200a. In certain such embodiments, the power generator is also used as a wheel rotation sensor 212, for example, by detecting and monitoring the rotation of components within the generator or by monitoring the frequency of the electrical power produced by the generator. Since generators use (and/or produce) magnetic fields, some embodiments magnetically shield the generator to avoid altering the magnetic field measurements taken by the magnetic sensors 204 in the heading sensor 202. However, in other embodiments, the magnetic field measurements are taken by the magnetic sensors 204 when the generator is at a zero-crossing, e.g., at the nulls of the AC magnetic field of the generator.

Certain embodiments are configured to detect (and possibly correct) errors in the distance traveled by the object. For example, some embodiments low-pass filter speed (or distance) measurements to smooth out variations in the measurements and to remove high frequency noise. One embodiment utilizes a low-pass filter with a cutoff frequency of a few Hz. In other embodiments, the system calculates the angular acceleration of the wheel to detect a missed wheel rotation signal caused by, for example, the wheel losing contact with the surface, or the wheel sliding or skidding on uneven or wet surfaces. Sudden changes in acceleration may be indicative of such traction errors, and the navigation system can reject suspect signals.

Some embodiments of the system can correct for intermittent traction, which can occur if the wheel passes over an uneven surface (e.g. a cobblestone surface). In some of these embodiments, the system stores an estimate of the average cart speed (or the average angular velocity of the wheel) by, for example, averaging a number of past measurements. If a measurement of the instantaneous speed (or wheel angular velocity) departs from the average by more than a specified amount, the measurement can be rejected and the average used instead. By tracking a number of past measurements, the navigation system can use well-known kinematic relationships to estimate (and track) dynamical parameters such as an acceleration or a jerk (time rate of change of acceleration). Under the assumption that accelerating objects travel at approximately constant accelerations (over short periods of time), detection of a sufficiently large jerk can indicate that error correction is needed.

c. Timing System

In the embodiment shown in FIG. 2A, the navigation system 200a comprises a timing system 216. In some embodiments, the timing system 216 is a separate component or module, while in other embodiments the timing system 216 is integrated with other components (e.g., the processor 220). The timing system 216 may comprise one or more master oscillators, clocks, crystals, counters, or other suitable timing circuits. Many possible timing systems 216 well known in the art can be used with embodiments of the navigation system 200a.

In some embodiments, the timing system 216 can communicate timing information to other system components, such as the heading sensor 202, the motion sensor 206, and/or the processor 220. In certain embodiments, the timing system 216 is used to provide elapsed times so as to enable conversion of distance traveled into an average speed. In other embodiments, the timing system 216 is used to provide synchronization of the signals from the other system components. In certain preferred embodiments, the navigation system 200a utilizes the timing system 216 to store a time history of the object's position, speed, and/or other characteristics.

d. Processor

In the embodiment schematically shown in FIG. 2A, the processor 220 implements a dead reckoning algorithm to determine the object's position by combining heading information from the heading sensor 202, speed or distance information from the motion sensor 206, and elapsed time measurements from the timing system 216. As shown in FIG. 2A, the processor 220 can, in various embodiments, output suitable signals to external or peripheral devices such as, for example, a transceiver 240, an alarm 244, a brake mechanism 248 to lock the wheel, and/or a monitor or display 252. The processor 220 can be connected to the peripheral devices by wires that are routed, for example, through or on the frame of the object. In other embodiments, wireless communication techniques are used.

In some embodiments, the display 252 is mounted to a portion of the object such as, for example, a handle on a shopping cart. The display 252 may include a display screen, such as a touch screen, that is viewable by a person pushing the object. The display 252 can be used to display information received from the processor 220. For example, the display 252 may show a graphic illustrating the position of the object within a facility. The display 252 may be connected to other controllers, processors, and/or transceivers and configured to output additional information. In embodiments suitable for a retail store, the display 252 may have a card reader or wand that enables customer to swipe a customer loyalty card or another type of card that identifies the customer. In these embodiments, the transceiver 240 may be configured to convey the customer identifier (as well as position information from the navigation system 200a) to a remote transceiver (or an access point) such that this identifier (and position information) can be associated with other information received from the cart during the customer's shopping session. Further information related to tracking the locations and monitoring the status of objects (such as shopping carts) is disclosed in the Two-Way Communication Patent Application.

The processor 220 preferably is disposed close to the heading and motion sensors 202 and 206. In a preferred embodiment, the processor 220 is disposed in the wheel; however, in other embodiments, the processor is disposed elsewhere in the object, for example, in the wheel assembly (e.g., fork or caster), the handlebars, or the frame of a cart. The processor 220 may be distributed in the object with, for example, some processing portions in the wheel and/or wheel assembly and/or other processing portions located elsewhere (e.g., the handlebars or the frame or in a spatially remote processor). In other embodiments, the processor 220 (or portions thereof) is remote from the object (e.g. a remote computer or controller), and the sensors 202 and 206 communicate with the processor 220 via wired or wireless communications. The navigation system 200a can be configured differently than shown in FIG. 2A, which illustrates one particular embodiment of a processor 220.

In certain embodiments, the processor 220 comprises one or more microcontrollers or microprocessors. In some embodiments, the processor 220 includes a digital signal processor (DSP), an analog-to-digital converter (ADC), on-board memory (including flash memory, RAM, and/or ROM), interfaces, counters, and/or other suitable components.

In the embodiment schematically depicted in FIG. 2A, the processor 220 comprises a position determination module 224, an error correction module 228, a location reset module 232. Other embodiments may utilize fewer or additional modules or components and may configure the modules differently. Additionally, in other embodiments the modules may implement the processor's functions (e.g., position determination) differently or in a different order.

As used herein, the term module refers to logic embodied in hardware or firmware, or to a collection of software instructions, possibly having entry and exit points, written in a programming language, such as, for example, C, C++, or FORTRAN. A software module may be compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may be embedded in firmware, such as an EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Additionally, functions, processes, logic, and/or procedures carried out by one or more modules may be organized and/or combined differently than described without departing from the scope of the disclosed inventions.

In the embodiment schematically illustrated in FIG. 2A, the position determination module 224 implements an embodiment of a dead reckoning algorithm. The position determination module 224 combines headings, speeds, distances, and elapsed times to update the position of the object as described further herein. In certain preferred embodiments, the position determination module 224 compares the object's current position with the known position of the perimeter of a tracking area (e.g., the lot boundary 118 in FIG. 1), and if the position of the object is outside the perimeter, the processor 220 triggers, for example, the alarm 244 or a wheel brake 248.

The error correction module 228 can be configured to correct errors in input parameters (such as heading and/or speed or distance or wheel rotation) as further described below. In some embodiments, the error correction module implements some of the error-correcting procedures discussed with reference to the magnetic sensor signal conditioning module 208. If errors exceed certain tolerances, the position update generated by the position determination module 224 is rejected, and flow of control returns to the position determination module 224 for determination of a new position update.

In certain preferred embodiments, the error correction module 228 implements a control algorithm that provides an optimal or best estimate of the object's position (or velocity). This optimal estimate may depend (in part) on the object's prior positions. For example, certain embodiments implement a data processing algorithm to provide a best-estimate position for the object based on some or all of the information available to the system 200a. The data processing algorithm may be adapted to filter, smooth, interpolate, or predict, or correct the object's position. In one embodiment, the data processing algorithm comprises a Wiener and/or a Kalman filter.

Certain embodiments of the navigation system 200a comprise a location reset module 232. The module 232 is configured to accept signals representing the position of nearby reference locations or landmarks. For example, in some embodiments, as shown in FIG. 1, the markers 130a-130c, the transmitters 134, and/or the access points 136 (AP) communicate a known position to the system 200a. The location reset module 232 resets the object position to reflect the information communicated by the marker, transmitter, or AP. By resetting the object position, any position errors accumulated during previous dead reckoning steps are eliminated (or at least reduced). Accordingly, embodiments that comprise a location reset module 232 advantageously provide more reliable and accurate object positions. In one embodiment, the navigation system 200a utilizes a received signal strength indicator (RSSI) to determine a distance between the object and the transmitter 134 (or marker 130a-130c or AP 136). The change in the distance can be used to determine whether the object is moving toward or away from the transmitter (or marker or AP).

In some embodiments, the processor 220 includes storage 236, which may comprise volatile or nonvolatile memory, including, for example, DRAM, SRAM, ROM, or cache. The storage 236 can also comprise retrievable memory including, for example, a hard drive, a floppy drive, an optical drive (e.g., CD-ROM or DVD), a flash drive, or other memory device. In an embodiment, the processor 220 stores selected information (including time histories) relating to the object and its environment such as, for example, position, speed, velocity, acceleration, path, vicinity to reference locations or areas or to other objects. The navigation system 200a may comprise circuitry configured to download, transfer, transmit, or otherwise communicate such information to other objects, devices, and/or controllers. In some embodiments, the system 200a communicates to other devices via one-way or two-way RF (or VLF) signals.

Other configurations of the processor 220 are possible. For example, the order in which the processor 220 implements the modules 224, 228, and 232 may be different in other embodiments. In some embodiments, the processes implemented by the modules may be shared among modules differently than shown in FIG. 2A. For example, certain aspects of the error correction module 232 may be carried as part of the position determination module 224 (e.g., correcting for heading or speed errors).

e. Anti-Theft System Using a Dead Reckoning Navigation System

Figure 2B:
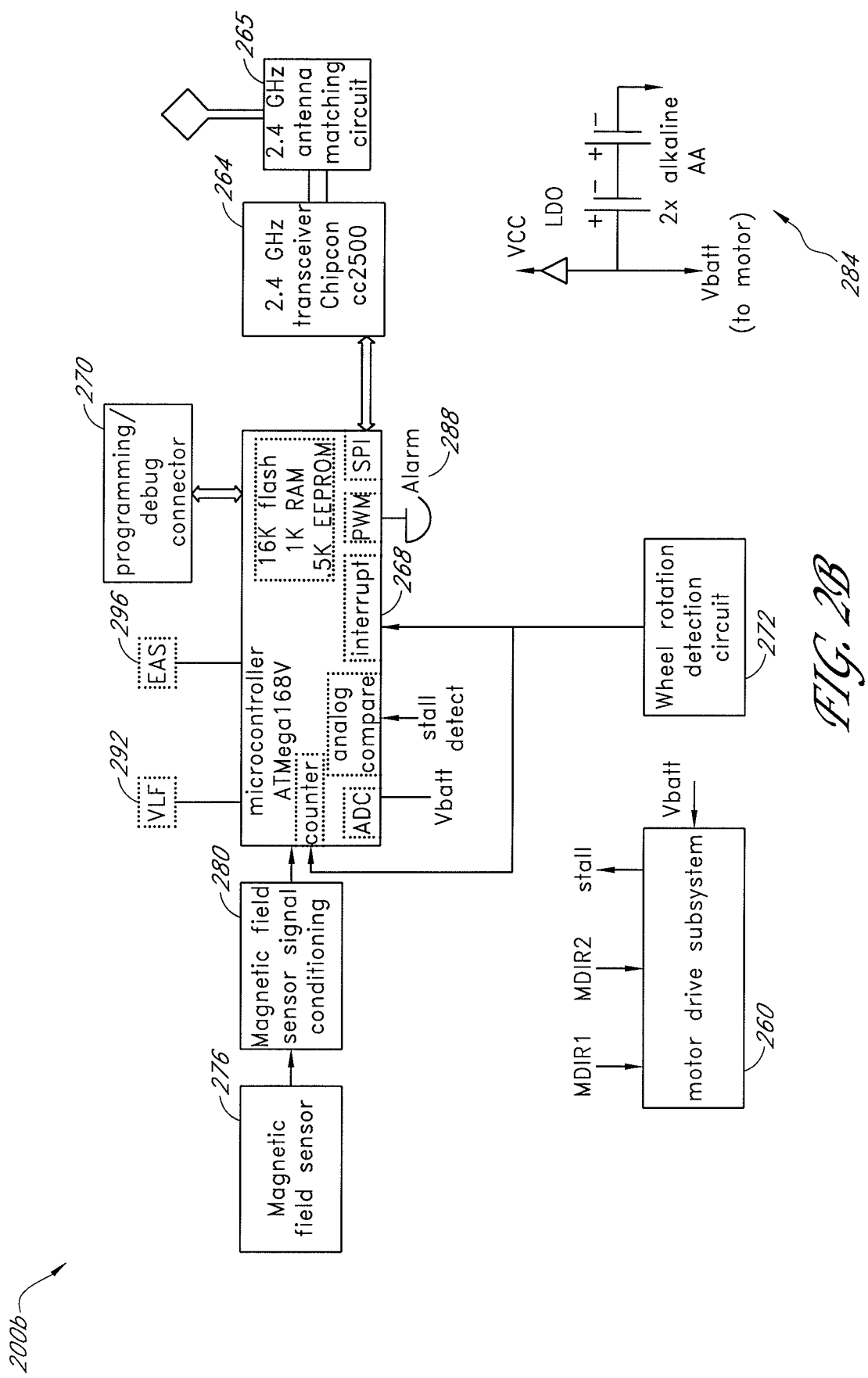
FIG. 2B is a block diagram of one embodiment of a navigation system suitable for use with an anti-theft system disposed in a wheeled object.

FIG. 2B illustrates a schematic block diagram of one embodiment of a navigation system 200b suitable for use with an anti-theft system disposed in a wheeled object such as, for example, a shopping cart. In this embodiment, the anti-theft system comprises a mechanism disposed in or in conjunction with a wheel of the cart, which can be engaged to inhibit cart motion if the cart is transported outside a predetermined area. In certain embodiments, this mechanism comprises a wheel brake. In other embodiments, other types of electromechanical mechanisms for inhibiting the motion of the cart, including mechanisms that cause one or more of the wheels of the cart to be lifted off the ground, can be used instead of, or in addition to, a brake mechanism. In some embodiments, the brake mechanism comprises an actuator that can engage an inner surface of the wheel so as to inhibit the motion of the wheel. In certain embodiments, the brake mechanism has an unlocked state in which the wheel can substantially freely rotate and a locked state in which the wheel's rotation is substantially impeded. In other embodiments, the brake mechanism is progressive, wherein the actuator can apply differing amounts of braking force to the wheel. The brake mechanism is actuated by a motor drive subsystem 260 having motor direction inputs MDIR1 and MDIR2 and a motor stall indicator. The anti-theft system may also include an alarm 288.

The navigation system 200b may be generally similar to the navigation system 200a (FIG. 2A). In this embodiment, the system 200b comprises a microcontroller 268 such as, for example, an 8-bit CMOS ATmega168V microcontroller (Atmel® Corp., San Jose, Calif.) including 16 Kbyte self-programming flash program memory, 1 Kbyte SRAM, 512 bytes EEPROM, an 8-channel 10-bit ADC, and one or more pulse width modulation (PWM) channels. A programming/debug interface 270 can be included in an embodiment.

In certain embodiments, the microcontroller 268 advantageously is configured to provide direct access to an EEPROM or flash memory which stores values for system parameter, rather than having first to load the parameters into a RAM memory. In one embodiment, the microcontroller 268 comprises a Texas Instruments MSP430 having 256 bytes of flash memory, which is accessible as ordinary data memory (Texas Instruments Inc., Dallas, Tex.).

The system 200b may include an RF transceiver 264 configured to transmit and receive RF signals. The transceiver 264 can be bidirectionally coupled to the microcontroller 268 via a serial peripheral interface (SPI). In certain embodiments, the transceiver 264 is configured to operate in the 2.4 GHz band and can transmit and receive 2.4 GHz RF signals via an antenna 265. In one embodiment, the transceiver 264 comprises a CC2500 multichannel 2.4 GHz RF transceiver (Chipcon AS, Oslo, Norway).

In some embodiments, the navigation system 200b further comprises a VLF transceiver 292 and/or a transceiver 296 configured to communicate with an electronic article surveillance (EAS) system. In certain embodiments, information relating to known reference locations (store exits, lot perimeters, etc.) can be communicated to the navigation system 200b and received by, for example, the 2.4 GHz transceiver 264, the VLF transceiver 292, and/or the EAS transceiver 296. In one embodiment, the VLF signal comprises an electromagnetic signal having a frequency below about 8 kHz. Such information can be used by the system 200b to reset the position of the object to the reference position as part of an error correction procedure (e.g., implemented by the error correction module 228 shown in FIG. 2A). In addition, certain embodiments of the system 200b use signals from the transceivers 264, 292, and/or 296 to assist in determining the position of the boundary of the tracking area or other suitable locations (such as checkout lanes in a retail store). The transceivers 264, 292, and/or 296 can also be used to communicate navigational information (e.g., position, speed, heading, path, etc.) from the navigation system 200b to a central controller or other suitable processing device.

Other embodiments of the navigation system 200b utilize additional or different devices to transmit and/or receive signals including, for example, electromagnetic signals (e.g., optical, infrared, and/or microwave) and/or acoustic signals (e.g., ultrasound). For example, in an embodiment used with a shopping cart, the navigation system 200b comprises an infrared sensor that detects an infrared signal from an infrared transmitter disposed in the exit of a store to determine when the cart has entered or left the store.

In the embodiment shown in FIG. 2B, the navigation system 200b also comprises a wheel rotation detection circuit 272, a magnetic field sensor 276, and a magnetic field sensor signal conditioning circuit 280 that are generally similar to the modules 212, 204, and 208, respectively, described with reference to FIG. 2A. These components provide information to the dead reckoning algorithm so as to determine the position of the object.

The navigation system 200b further comprises a power source 284 that, in an embodiment, comprises an electrochemical power source (e.g., 2 AA alkaline batteries) and a low dropout (LDO) regulator to provide a regulated output voltage to integrated circuit components. In other embodiments, rechargeable batteries and/or a photovoltaic source may be used in addition to or instead of the alkaline batteries. In some embodiments, the power source 284 also supplies power to the motor drive subsystem 260. In certain preferred embodiments, the navigation system 200b and the motor drive subsystem 260 are powered by a generator mechanism configured to convert a portion of the rotational kinetic energy of the wheel into electrical power.

IV. Navigation Methods

Certain preferred embodiments of the navigation system use dead reckoning methods to determine the position of an object. Various embodiments of a dead reckoning algorithm will be described below; however, it is recognized that alternative algorithms and implementations of algorithms can be used with the navigation system disclosed herein. Accordingly, the description of the algorithms and methods herein is intended to facilitate understanding of the principles of the navigation system but is not intended to limit the scope of this navigation methods used by the system.

Figure 3:
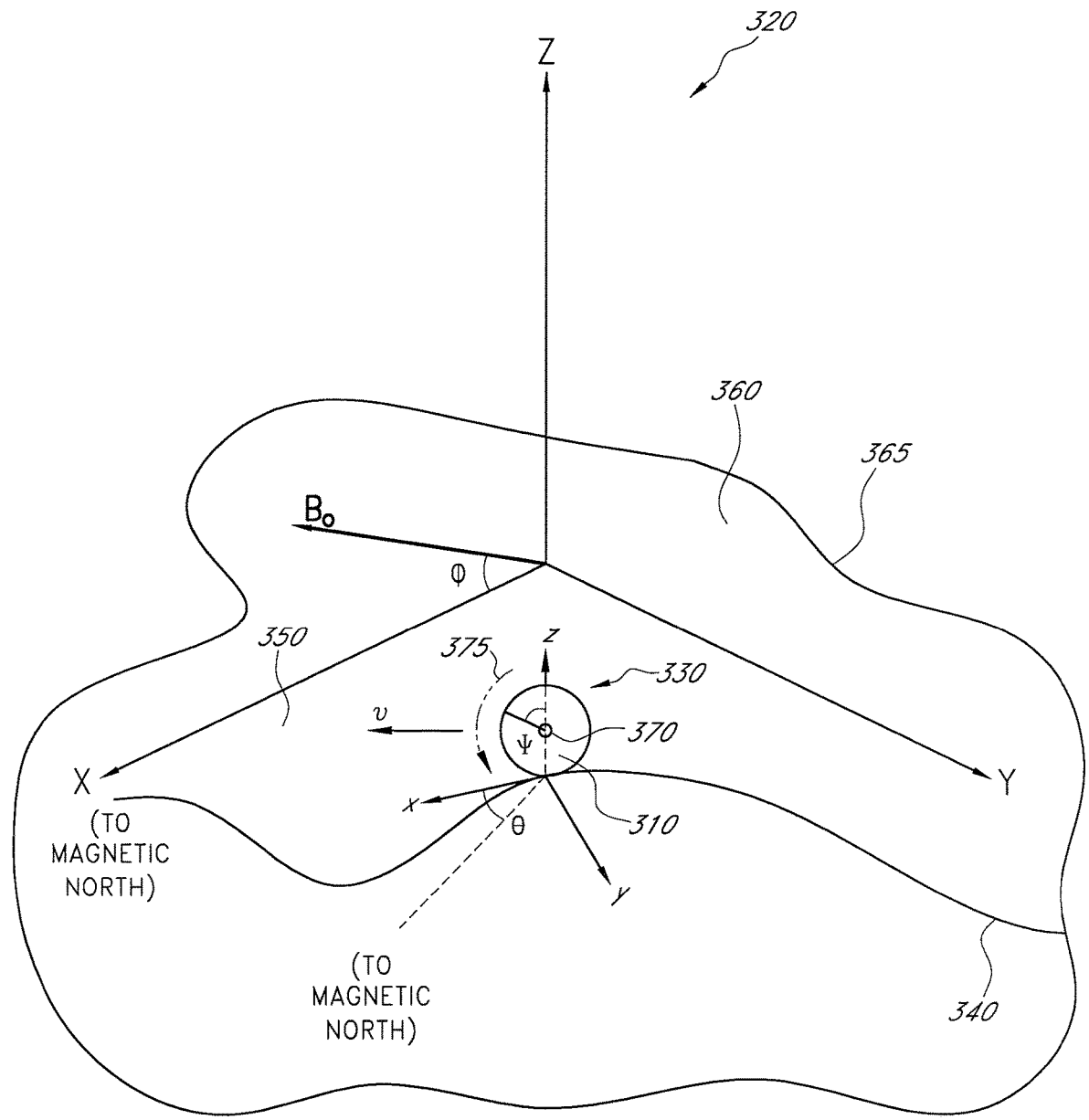
FIG. 3 schematically illustrates convenient coordinate systems for describing the motion of an object.

FIG. 3 illustrates two convenient three-dimensional Cartesian coordinate systems 320 and 330 for describing the motion of an object 310. As is well known, coordinate systems other than Cartesian coordinate systems can be used. The first coordinate system 320 (denoted by upper case X, Y, Z) is fixed to the Earth and may be oriented so that the X-axis points in the direction of the geomagnetic North pole. The Y- and Z-axes are mutually perpendicular to the X-axis and to each other. The Z-axis is vertical (parallel to the direction of the local gravitational acceleration vector), and the X-Y plane is horizontal (perpendicular to the local gravitational acceleration vector).

As illustrated in FIG. 3, the object 310 moves on a path 340, which in general is a three-dimensional trajectory. The position of the object at a time t may be referenced by three Cartesian coordinates (X(t), Y(t), Z(t)). In some embodiments, the position refers to the center-of-mass of the object, while in other embodiments, the position refers to a point of contact between the object and a surface on which it travels.

The second coordinate system 330 (denoted by lower case x, y, z) is attached to and moves with the object 310 (e.g., it is a body-centered coordinate system). The x-axis points in the instantaneous direction of motion of the object. The y- and z-axes are mutually perpendicular to the x-axis and to each other. The angle $\theta$ is defined to be the angle between the instantaneous direction of the x-axis and the fixed direction of the X-axis (e.g., geomagnetic North). In some embodiments, the angle $\theta$ is used as the heading of the object. The instantaneous speed of the object is denoted by v(t) and in general is a function of the time t.

For ease of illustration in the following discussion and not as a limitation on the navigation methods disclosed, it is assumed that the path 340 of the object 310 lies in a plane, hereinafter denoted the navigation plane 350. The navigation plane 350 generally corresponds to a portion of a tracking area 360 in which the object's position is to be determined. For example, in FIG. 1, the tracking area 360 corresponds to the parking lot 114. In some embodiments, the navigation plane 350 is nominally parallel to a best-fit plane to a perimeter 365 of the tracking area 360. In one embodiment, the perimeter 365 of the tracking area 360 is a modeled as a set of connected line segments (e.g., a polygon), which comprise a locus of points (e.g., vertices) in space. In this embodiment, the desired navigation plane 350 is the plane that minimizes a distance metric (e.g. a root-mean-square distance), from the perimeter locus to the best-fit navigation plane 350. If the tracking area 360 is substantially close to being a single plane, some embodiments define the navigation plane 350 to be the plane containing the three farthest separated vertices of the tracking area 360.

In general, the navigation plane 350 is tilted with respect to the Earth-based coordinate system 320 (e.g., the tracking area 360 is not perfectly level). In the following example discussion, it is assumed the navigation plane 350 coincides with the Earth's horizontal plane (e.g., the X-Y plane) so that the object's Z-axis position at all times is Z(t)=0. It is appreciated, however, that navigation methods for a tilted navigation plane 360 can be straightforwardly developed using standard geometric and trigonometric calculations.

In some embodiments of the dead reckoning navigation system, the object's position at a time t is determined from the following kinematic equations $$X(t) = X(t_0) + \int_{t_0}^{t} v(t)\cos\theta(t)\,dt \quad (1)$$

$$Y(t) = Y(t_0) + \int_{t_0}^{t} v(t)\sin\theta(t)\,dt.$$

According to Eq. (1), at an initial time $t_0$ the object is at a known position $(X(t_0), Y(t_0))$, and the navigation system determines the object's position at any later time t by integrating the object's speed, v(t), and heading, θ(t), with respect to time.

The integrals in Eq. (1) can be evaluated by many different methods as is well known in the numerical and computational arts. In some embodiments, the navigation system determines the speed $v_i$ and the heading $\theta_i$ at sampling times $t_i$, where i is an index labeling the samples. The sample interval $\Delta t_i$ in general can vary with time, although in some embodiments a fixed (constant) sample rate is used. In certain embodiments, the integrals in Eq. (1) are approximated by sums, and the object's position is determined according to $$X = X_0 + \sum_{i} v_i \cos\theta_i \Delta t_i \quad (2)$$

$$Y = Y_0 + \sum_{i} v_i \sin\theta_i \Delta t_i.$$

Other embodiments of the navigation system may use numerical methods different from Eq. (2) to evaluate the integrals in Eq. (1) such as, for example, the trapezoidal rule, Simpson's rule, or another suitable quadrature method.

Other embodiments of the navigation system may use methods that are different from those discussed with reference to Eqs. (1) and (2). For example, one embodiment uses one or more acceleration sensors to detect the acceleration in the direction of the object's motion. The speed of the object is determined by integrating the measured acceleration with respect to time:

$$v(t) = \int_{t_0}^{t} a(t)\,dt.$$

The object's position can be determined from this speed (and heading) by the methods discussed herein. In some embodiments, the acceleration sensor comprises an accelerometer comprising, for example, a piezoelectric or MEMS device. It is appreciated that many other dead reckoning methods may be readily implemented in embodiments of the systems discussed herein. Accordingly, the disclosure of certain example embodiments is not intended to limit the scope of the navigation principles suitable for use with navigation systems.

a. Heading Determination

In certain embodiments, the heading $\theta_i$ is determined from magnetic field measurements taken by, for example, the magnetic sensors 204 (FIG. 2A). The Earth's magnetic field $B_0$ is shown in FIG. 3. Due to the choice of orientation for the Earth-based coordinate system 320, the vector $B_0$ lies in the X-Z plane and makes an angle φ with respect to the X-axis. The angle φ generally is a negative angle in the Northern Hemisphere. If the navigation plane 350 is horizontal with respect to the local gravitational acceleration vector, the angle φ is the negative of the geomagnetic inclination angle.

In certain embodiments, the magnetic field sensor 212 is oriented to measure two or more components of the local magnetic field along the (x,y,z) coordinate directions of the coordinate system 330. In the coordinate system 320, the geomagnetic field has components $$B_x = B_0 \cos\varphi \cos\theta$$

$$B_y = B_0 \cos\varphi \sin\theta$$

$$B_z = B_0 \sin\varphi. \quad (3)$$

The heading angle θ is determined from the magnetic field measurements according to θ=arctan($B_y/B_x$). In some embodiments, since the dead reckoning algorithm does not use θ directly but only through sin θ and cos θ, these trigonometric quantities are determined efficiently and directly from the magnetic field measurements according to $$\sin\theta = \frac{B_y}{\sqrt{B_x^2 + B_y^2}} \quad (4)$$

$$\cos\theta = \frac{B_x}{\sqrt{B_x^2 + B_y^2}}.$$

Additionally, certain embodiments of the navigation system comprise a three-axis magnetic field sensor that measures the vertical magnetic field component $B_z$ in addition to the field components in the navigation plane 350. Such embodiments can determine the magnitude of the local field according to $B = \sqrt{B_x^2 + B_y^2 + B_z^2}$ and the angle φ according to $\varphi = \arctan(B_z/\sqrt{B_x^2 + B_y^2})$. As further discussed with reference to the magnetic sensor signal conditioning module 208 (FIG. 2A), various embodiments compare the measured field magnitude (and/or the angle φ) to the corresponding known or measured local values of the geomagnetic field $B_0$ to determine the reliability of the magnetic measurements. If the measured values do not agree with the known geomagnetic values (to within a tolerance), the magnetic field measurements are rejected as having unacceptably large errors. Such anomalous magnetic field measurements may be due to the presence of nearby metallic objects (such as automobiles) or buried metal plates (such as buried steel reinforcing bars).

b. Position Reset to Reduce Error Accumulation

As the navigation system tracks the movement of the object, errors in the object's position will accumulate due to sources such as, for example, measurement errors in the magnetic field components, the speed, and the heading, timing errors, and numerical integration errors. Accordingly, the measured position of the object, as determined by the navigation system, will begin to depart from the true position of the object.

Certain preferred embodiments reduce the accumulated error by resetting the position of the object to be a known reference position at various times or at various locations. Following the position reset, the system determines subsequent positions via dead reckoning. By occasionally resetting the object position, any error accumulated up to the reset time is eliminated (or at least reduced) from the system. Embodiments of the navigation system that implement a position reset procedure advantageously can determine the object's position more accurately and reliably.

In some embodiments, markers or beacons (e.g., the markers 130a-130c, the transmitters 134, and/or the access points 136 shown in FIG. 1) are disposed throughout the tracking area, and if an object passes within a specified range of the marker or beacon, the navigation system performs the position reset procedure to reduce accumulated error. In the embodiment of the navigation system 200a schematically illustrated in FIG. 2A, the reset procedure is implemented in the location reset module 232. In certain embodiments, the position reset markers are magnetic markers as further described below.

Position reset information can be communicated to the navigation system from sources other than (or in addition to) magnetic markers. For example, transmitters (or transceivers) disposed throughout the tracking area can communicate reference positions (or other information) via RF, VLF, or other suitable signals. The transmitters may be part of an anti-theft system such as, for example, an EAS system and/or a perimeter confinement system. In other embodiments, position information is communicated via optical, infrared, and/or microwave signals or acoustic signals (e.g., ultrasound).

c. Improved Position Determination

Certain embodiments of the navigation system utilize one or more control-based algorithms to determine a more reliable estimate of the object's position. For example, embodiments of the system can be configured to use information related to the object's past positions (and/or speeds, headings, etc.) to provide an "optimal" or "best-fit" estimate of the object's present position. As is well known in the art, such optimal or best-fit estimates may utilize various signal processing or control theory methods. For example, some embodiments of the system use one or more filters to reduce the effects of measurement noise and to provide more reliable position data. Filters include, but are not limited to, analog filters or digital filters such as recursive (IIR) and non-recursive (FIR) filters. Certain embodiments use various "predictor-corrector" algorithms such as, for example, a Kalman filter, to provide improved position determinations. In the embodiment schematically illustrated in FIG. 2A, the error correction module 228 may be configured to implement one or more of these algorithms.

In one embodiment, measurement errors are reduced by averaging speed and/or heading data. For example, if the variance corresponding to a heading measurement $\theta_i$ is $\sigma_i^2$, an improved estimate of the present heading $\hat{\theta}_i$ can be determined from a weighted average of the prior M measurements where the weighting coefficients are the inverse measurement variances:

$$\hat{\theta}_i = \frac{\sum_{j=0}^{M-1} \frac{\theta_{i-j}}{\sigma_{i-j}^2}}{\sum_{j=0}^{M-1} \frac{1}{\sigma_{i-j}^2}}. \tag{5}$$

Analogous formulas can be used for any other measured quantity. In some embodiments, these averaging methods are implemented in the position determination module 224 and/or the error correction module (FIG. 2A). The averaging formula in Eq. (5) is intended to be an example of the type of averaging or smoothing that can be applied to measured data and is not intended to limit the scope of averaging, filtering, or other error correction methods that can be utilized by embodiments of the navigation system.

d. Navigation Systems for Wheeled Objects

Certain embodiments of the navigation system are configured to track the position of a wheeled object. FIG. 3 illustrates a wheel 310 moving along the path 340 in the navigation plane 350. As with the example discussion above, it is assumed that the navigation plane 350 is horizontal and lies in the X-Y plane of the Earth-based coordinate system. Methods for tilted navigation planes are readily developed using standard geometric and trigonometric calculations.

The wheel 310 is assumed to be generally circular, having an outer radius r, and a corresponding circumference 2πr. The radius r can be measured and provided to the navigation system. The wheel 310 rotates about a central rotation axis 370. The (x,y,z) coordinate system 330 attached to the moving wheel is oriented so that the x-axis points in the direction of motion, the y-axis is parallel to the rotation axis 370, and the z-axis is mutually perpendicular to the x- and y-axes. In the following example discussion, it is further assumed that the wheel 310 is oriented generally vertically, e.g., the rotation axis 370 is generally parallel to the X-Y plane. In this case, the z-axis is vertical and parallel to the Z-axis (e.g., it is parallel to the local gravitational acceleration vector).

The wheel 310 rotates about the rotation axis 370 at an angular velocity f indicated by arrow 375. The angular velocity f may be measured in revolutions per unit time. In other embodiments, the angular velocity f is measured other suitable units such as radians per unit time. Except as further described herein, it is assumed that there is sufficient friction between the tracking area 360 and the wheel 310 so that the wheel 310 rotates without slipping, sliding, or skidding. This type of kinematical motion is commonly known as pure rolling motion. In pure rolling motion, for every rotation of the wheel 310 through a full 360 degrees, the center of the wheel 310 moves a distance equal to the wheel's circumference 2πr. Accordingly, by combining knowledge of the amount of the wheel's rotation with knowledge of the wheel's heading, the position of the wheel (and the object to which it is attached) can be determined.

It is convenient to use a rotation angle ψ that measures the angle through which the wheel 310 has rotated during its motion (see FIG. 3). The rotation angle is related to the angular velocity f and the time t by $$\psi = \int_{t_0}^{T} f\, dt.$$

The angle ψ, in some embodiments, is measured by the wheel rotation sensor 212 (FIG. 2A). In pure rolling motion, the speed of the object is v=2πf r. Substituting this relation for v into Eqs. (1) and (2) permits them to be rewritten in an equivalent form in terms of the rotation angle ψ rather than the time t. For example, Eq. (2) for the object's position can be written in the following form $$X = X_0 + 2\pi r \sum_i \cos\theta_i\, \Delta\psi_i \quad (6)$$

$$Y = Y_0 + 2\pi r \sum_i \sin\theta_i\, \Delta\psi_i.$$

Embodiments of the navigation system utilizing Eq. (6) are advantageous, because the system need not keep track of the time but need only track the amount of wheel rotation $\Delta\psi_i$ between heading measurements. Such embodiments may beneficially conserve power resources, because a timing system (e.g. the timing system 216 in FIG. 2A) is not required.

In certain embodiments, Eq. (6) can be further simplified, because the heading measurements are taken whenever the wheel rotates by a fixed amount (e.g., every 30 degrees of wheel rotation). In such embodiments, $\Delta\psi_i$ is a (known) constant, and the position of the object is determined simply by summing the cosine (or sine) of the heading angle. For example, in certain preferred embodiments, the wheel rotation sensor 212 (FIG. 2A) comprises one or more bumps or cams that compress a piezoelectric sensor as the wheel 310 rotates. If there are N bumps or cams disposed substantially symmetrically about the wheel, the object's position may be updated according to $$X = X_0 + A \sum_i \cos\theta_i \quad (7)$$

$$Y = Y_0 + A \sum_i \sin\theta_i,$$

where the constant A=2πr/N is provided to the system. Navigation systems implementing Eq. (7) are beneficial, because they can incorporate relatively few mechanical and electrical components, they can rely only heading measurements and do not need independent timing and/or speed measurements, and they can utilize a computationally efficient position determination algorithm.

Figure 4:
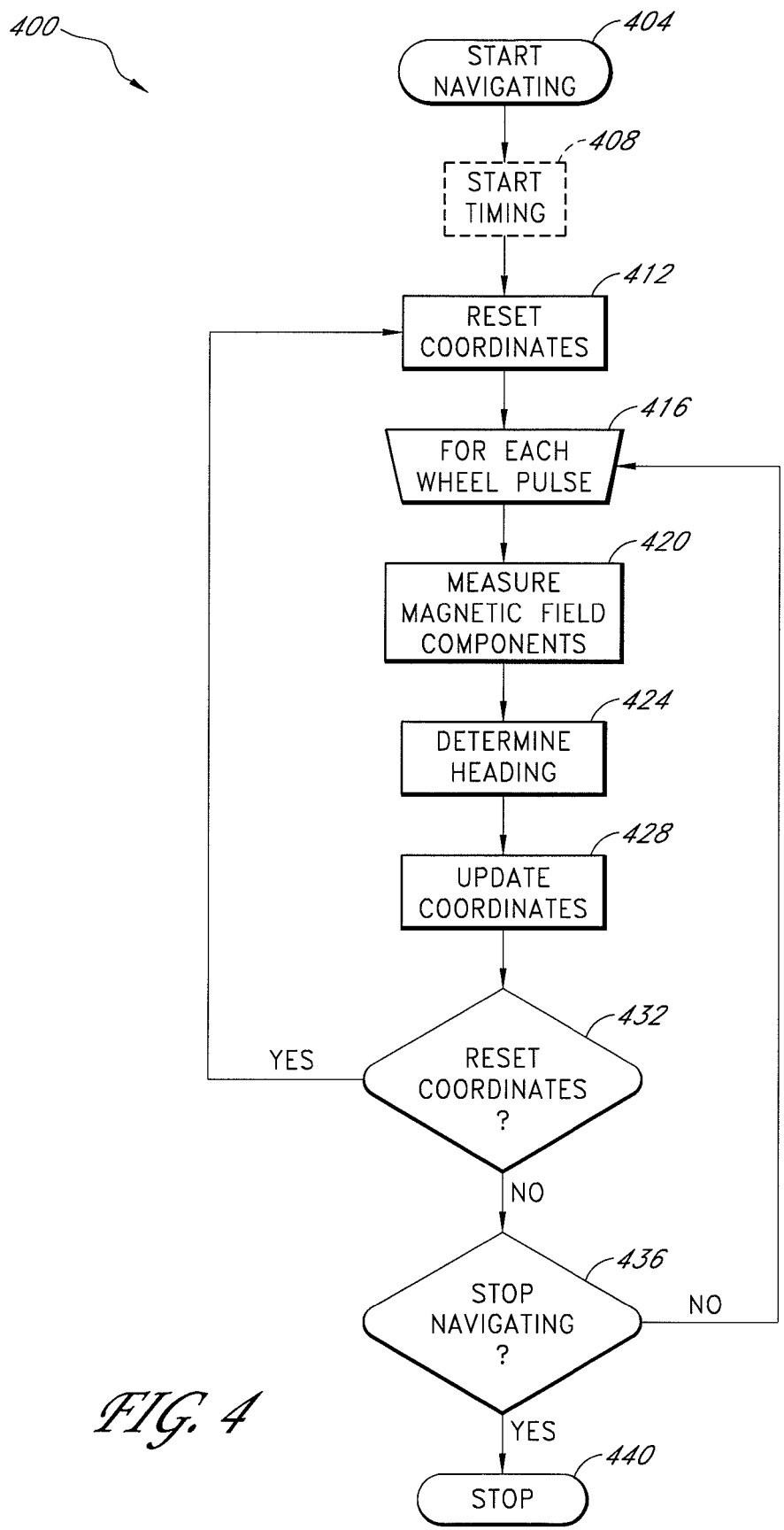
FIG. 4 is a flowchart for an embodiment of a navigation process for a wheeled object.

FIG. 4 illustrates a flowchart for one embodiment of a navigation process 400 for a wheeled object. This navigation process 400 can be implemented by the processor 220 (FIG. 2A) or by other suitable controllers. Although certain aspects of the process 400 will be illustrated in the context of a shopping cart and a retail store, this is for purposes of explanation only and is not intended as a limitation on the process 400.

The navigation process 400 starts at Block 404 when the system receives a start navigating signal, for example, when the cart exits the store. In Block 408, a clock is set to the current time and begins timing. The timing Block 408 is shown in phantom, because it is optional. For example, navigation systems utilizing a dead reckoning algorithm based on Eq. (7) do not require times or elapsed times to determine object position.

In Block 412, the position of the object is set to a known value from which subsequent dead reckoning positions are calculated. This position may correspond to the initial position of the object (e.g., the position of the store's exit) or to a known reference location in embodiments implementing a position reset procedure.

The dead reckoning algorithm is implemented in Blocks 416 to 428. For example, in the embodiment illustrated in FIG. 4, sensors in the wheel communicate a signal or pulse indicative of an amount of wheel rotation. Magnetic field sensors determine the components of the local magnetic field (Block 420), and determine the wheel's heading (Block 424) during the wheel's rotation. Heading can be determined using the techniques discussed for example with reference to Eq. (4), and the system can implement procedures to correct heading errors such as those discussed with reference to Eq. (5). In some embodiments, the magnetic field is measured many times (e.g., at a sampling rate in the range of about 10 Hz to about 250 Hz), and the heading is calculated by suitable averaging or filtering methods (as described with reference to the magnetic field sensor signal conditioning module 208 shown in FIG. 2A). In other embodiments, one (or a small number of) magnetic field measurements are taken for each wheel rotation pulse.

In Block 428, the coordinates of the object are updated based on the amount of wheel rotation and heading using, for example, algorithms such as Eqs. (6) or (7). In other embodiments, an average object speed is determined based on the amount of wheel rotation during an elapsed time, and the coordinates are updated according to, e.g., Eq. (2). Additionally, in Block 428, the process 400 may perform other actions based on the object's position such as, for example, activating an anti-theft system if the updated coordinates are outside a confinement perimeter.

In Block 432, the process 400 inquires whether a position reset signal is received (e.g., as part of an error reset procedure). If such a signal is received, the process 400 returns to Block 412 and resets the object's position to be the received reference position. Subsequent dead reckoning is measured from the reference position, which reduces (or eliminates) errors accumulated up to that point. If a position reset signal is not received, the process 400 continues to Block 436 and evaluates whether to continue navigating. In most cases the answer is affirmative, and the process 400 returns to Block 416 to determine the next updated position as the wheel continues to turn. However, if the process 400 receives a signal to stop navigating, the process 400 terminates (Block 440). A stop navigating signal may be sent, for example, when the cart reenters the retail store. By not navigating within the store (where it is less likely to be stolen), the system beneficially conserves power. In some embodiments, a stop navigating signal is sent if the cart is motionless for a predetermined time period (e.g., the cart has been left unattended in the lot by a customer), which also beneficially reduces power consumption. Additionally, a stop navigating signal may be sent if power resources drop to an unacceptably low value.

In some embodiments suitable for use on wheeled object such as carts, some or all portions of the process 400 are performed by one or more processors or controllers disposed in or on the cart. For example, in certain embodiments, the process 400 is carried out by a processor disposed in the wheel of the cart. In other embodiments, some or all of the processing circuitry is spatially distributed in the object, for example, by disposing some or all of the processing circuitry in the wheel, and/or in a wheel assembly (e.g., a caster or a fork), and/or in other portions (e.g., the handlebars or the frame). In one embodiment, the processor and the heading and motion sensors are disposed within the same wheel, while in another embodiment, the processor, heading, and motion sensors are distributed among different wheels. Many variations are possible.

e. Perimeter Detection

In certain embodiments, the navigation system is configured to determine whether the object is located inside or outside a tracking area. Such embodiments can advantageously be used with an anti-theft system designed to prevent the object from being transported outside the tracking area.

In one embodiment, the tracking area can be approximated by a circle of radius R surrounding a central location having coordinates $(X_c, Y_c)$. The navigation system can determine whether the object is outside the tracking area by evaluating whether $$(X-X_c)^2+(Y-Y_c)^2 \geq R^2. \tag{8}$$

Figure 5A:
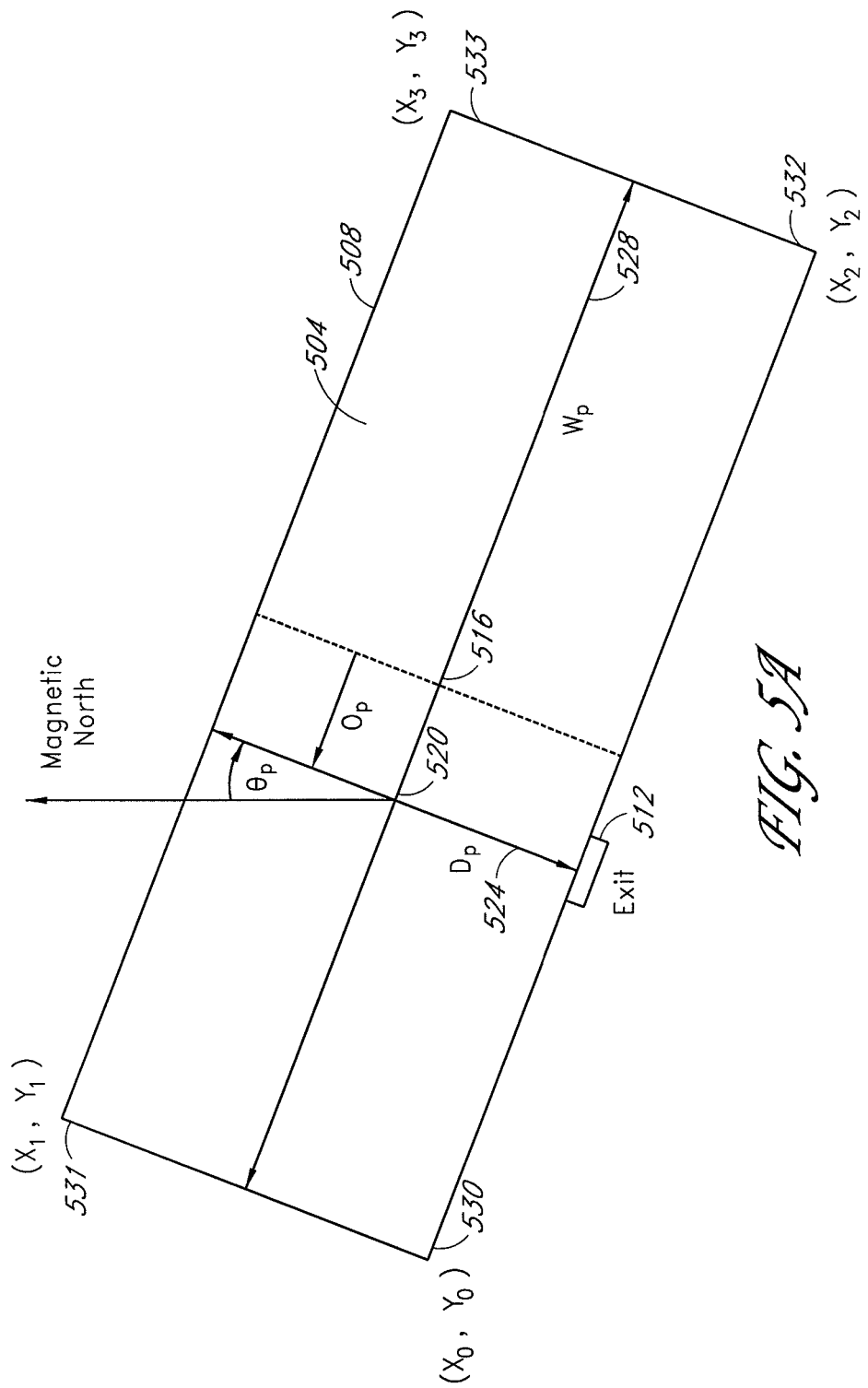
FIG. 5A schematically illustrates a rectangular tracking area.

In an embodiment illustrated in FIG. 5A, the tracking area is approximated as a rectangle 504 having a perimeter 508 and a center 516. The rectangle 504 is adjacent a mean exit point 512 of a facility (such as a retail store). If the facility has a single exit, the mean exit point 512 is the center of the exit, whereas if the facility has multiple exits, the mean exit point 512 may be defined as a first moment (e.g., an average) of each of the exit's center points.

In certain embodiments, the perimeter 508 is determined by four parameters: a depth $D_p$ from the mean exit point 512 measured straight along a depth line 524 to the outermost portion of the perimeter 508; a width $W_p$ measured along a width line 528 that is perpendicular to the depth line 524; an offset $O_p$ measured from the rectangle's center 516 to the intersection 520 between the depth and width lines 524 and 528; and an orientation angle $\theta_p$ between the direction of the depth line 524 and the direction of local geomagnetic North.

In other embodiments, the rectangle 504 is determined by the position of four vertices 530, 531, 532, and 533, labeled "0", "1", "2", and "3," which have coordinates $(X_0, Y_0)$, $(X_1, Y_1)$, $(X_2, Y_2)$, $(X_3, Y_3)$, respectively. Each pair of vertices defines a straight line having a slope, m. For example, the slope between vertex "0" and vertex "1" is denoted by $m_{01}$, and similarly for other pairs. The parameters $D_p$, $W_p$, $O_p$, and $\theta_p$ can be used to determine the coordinates of the vertices (and vice-versa) using standard trigonometric and geometric calculations.

In certain embodiments, the navigation system determines whether an object located at a point with coordinates (X,Y) is located within the rectangle 504 according to the following test:

If $((X<X_0)$ or $(X>X_3))$ then X,Y is not included in the rectangle 504.
If $((X<X_1)$ and $(Y>m_{01}(X-X_0)+Y_0))$ then X,Y is not included in the rectangle 504.
If $((X>X_1)$ and $(Y>m_{13}(X-X_1)+Y_1))$ then X,Y is not included in the rectangle 504.
If $((X<X_2)$ and $(Y<m_{02}(X-X_0)+Y_0))$ then X,Y is not included in the rectangle 504.
If $((X>X_2)$ and $(Y<m_{23}(X-X_2)+Y_2))$ then X,Y is not included in the rectangle 504.

If none of the above tests fail, then the point X,Y is located in the rectangle 504. In certain embodiments, if the point is located outside the rectangle 504, the test is performed once, a signal is sent to the anti-theft system, and evaluation of the test is stopped in order to conserve power resources.

In some embodiments, the navigation system is configured to determine whether the object lies inside or outside one or more regions within the overall tracking area. In such embodiments, more than one set of perimeters may be input to the system. For example, it may be desirable to provide a notification (such as an alarm) as the object approaches a specified perimeter (such as an outer confinement perimeter). In one embodiment, a notification perimeter, which lies a predetermined distance inside the confinement perimeter, is provided to the system. In this embodiment, when the object crosses the notification perimeter, a notification is given (e.g. an alarm is sounded) to alert the person moving the object that an outer boundary is being approached. If the object subsequently crosses the confinement perimeter, further action can be taken, e.g., one or more of the object's wheels can be locked. Other variations are possible. For example, in an embodiment, the tracking area is approximated as an outer area that comprises one or more inner areas. The inner and outer areas each have corresponding inner and outer perimeters. In some embodiments, the navigation system tracks whether (and for how long) the object is within the inner areas and whether (and when) the object has left the outer area.

In certain embodiments, the perimeter of the tracking area is approximated using portions of one or more lines, arcs, curves, planes, polygons, and/or other geometric figures. For example, in some embodiments the tracking area is approximated as a planar polygon having a set of vertices. Each successive pair of vertices defines an edge of the polygon. In some embodiments, the vertices are referenced by a set of Cartesian coordinates or by a set of angles and directions. A number of computationally efficient algorithms for determining whether a point lies within a polygon (the so-called "point-in-polygon" problem) are well-known in the numerical and graphical arts and can be implemented in various embodiments of the navigation system. For example, in one embodiment, the system calculates the number of times an imaginary straight ray extending from the point (to infinity) intersects the edges of the polygon. The point is inside the polygon if the number is odd, and the point is outside the polygon if the number is even. Other algorithms can be used as well.

Although the examples discussed herein refer to a tracking area surrounded by a perimeter, it is appreciated that some embodiments may be configured to determine the object's position in a three-dimensional tracking volume. In such embodiments, the navigation system calculates, for example, all three (X,Y,Z) coordinates of the object. In such embodiments, the perimeter of the tracking volume generally corresponds to a boundary surface, which likewise can be approximated by portions of lines, arcs, curves, planes, and/or by portions of surfaces of geometric figures such as spheres, ellipsoids, cubes, parallelepipeds, etc.

f. Tracking Area and Perimeter Coordinates

The perimeter of a tracking area can be provided to the navigation system in many different ways, for example, by inputting a set of coordinates corresponding to the vertices of a polygon approximating the tracking area. The coordinates of the perimeter can be determined, for example, by direct measurement (e.g., a survey) or by reference to a map or GPS information or by other suitable methods.

In embodiments using magnetic sensors to determine object position, the coordinates of a point measured by dead reckoning can differ from the true coordinates due to a number of factors. For example, carts are metallic objects and can retain a remnant permanent magnetization that can cause position measurements to systematically differ from true measurements. Geological conditions can cause the local geomagnetic field at a site to deviate in magnitude and/or direction from the mean geomagnetic field in the surrounding region. In addition, surrounding infrastructure (e.g., roads, buildings, etc.) can lead to magnetic deviations on even smaller scales. Such deviations can lead to offsets between measured and true positions. Embodiments of the navigation system can correct for such effects by incorporating boundary coordinate data that accounts for such deviations.

Figures 5B, 5C:
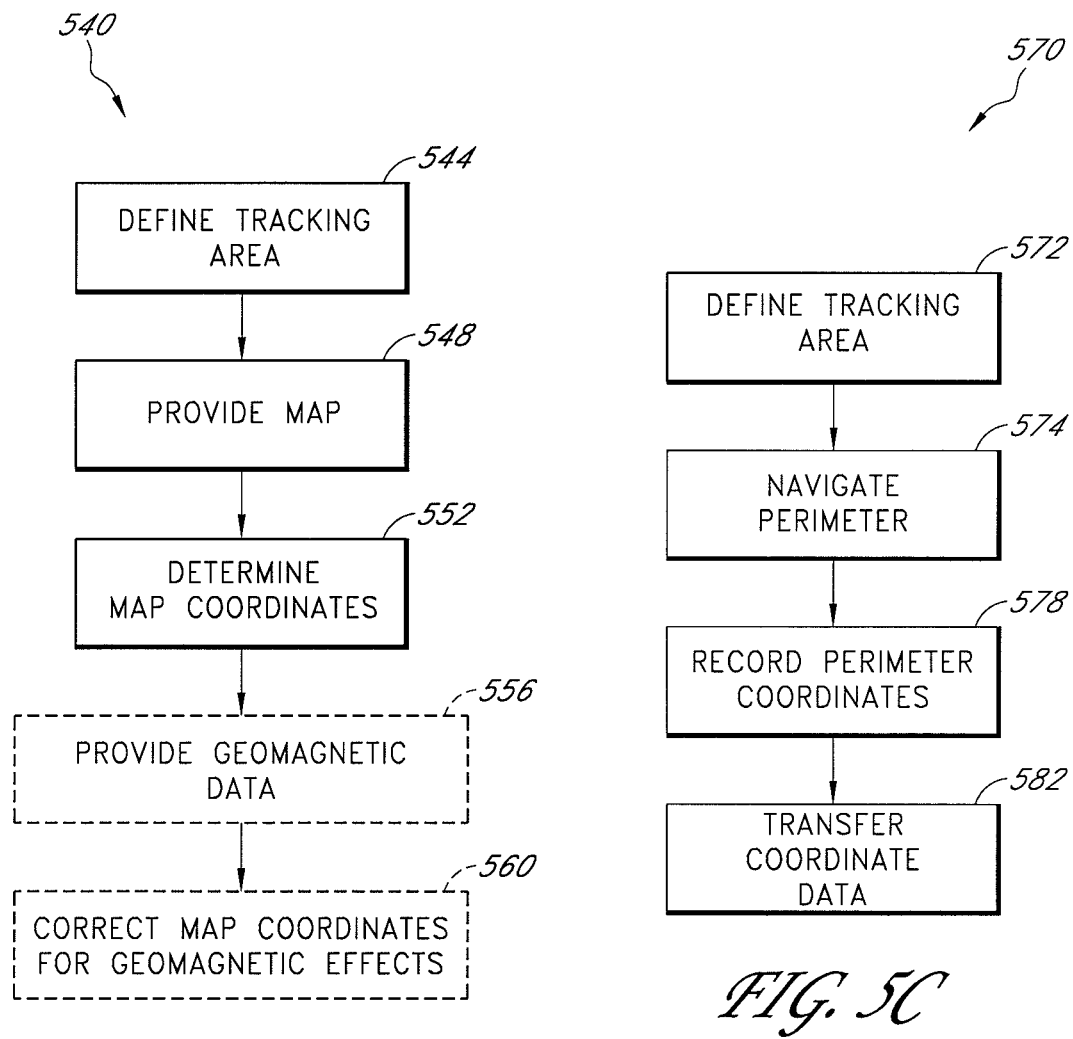
FIG. 5B is a flowchart for an embodiment of a method for determining coordinate values from maps.
FIG. 5C is a flowchart for an embodiment of a method for determining coordinate values by training.

In some embodiments, coordinates of the perimeter of the tracking area are determined by reference to a detailed map, which (optionally) may be corrected for the effects of the local geomagnetic field. FIG. 5B is a flowchart illustrating an embodiment of a method 540 for determining coordinates in a tracking area. In Block 544, the tracking area is defined logically. For example, the general shape and extent of the tracking area is selected, and a method for representing the tracking area (e.g., via a polygon) is chosen. The complexity of the tracking area, which entrances and exits to include, and where reference locations are positioned are addressed at this step. In Block 548, a suitable map is selected. The map can come from many sources such as, for example, a survey, GPS measurements at the site, street maps, atlases, or from commercial mapping providers. In an embodiment, maps are generated from data provided by the Internet service Google Earth (Google Corp., Mountain View, Calif.) or by other similar services. In Block 552, the map is used to calculate map coordinates corresponding to a portion or portions of the tracking area. The map may also be used to determine coordinates for other suitable locations in or around the tracking area. The map coordinates may comprise Cartesian or other suitable coordinates or may comprise a set of distances and angles or other directional suitable system. In some embodiments, the map coordinates for portions of the tracking area are communicated to the navigation system, whereas in other embodiments, the map coordinates are stored on a central processor, which receives position information from the navigation system.

In certain embodiments using magnetic techniques to determine heading, it is beneficial to correct the map coordinates for effects of the local magnetic field including, for example, geomagnetic declination (deviation between magnetic North and true North), geomagnetic inclination (deviation of the magnetic field from the horizontal), and/or other magnetic deviations and anomalies. FIG. 5B shows in phantom additional and optional steps implemented in certain embodiments of the mapping method 540. In Block 556, a source of suitably detailed geomagnetic data is provided. In an embodiment, up-to-date geomagnetic data from the National Geophysical Data Center (Boulder, Colo.) is used. In other embodiments, magnetic measurements can be taken at the site to provide more detailed information on local magnetic conditions. In Block 560, the map coordinates determined in Block 552 are corrected for magnetic effects. These updated coordinates can be provided to the navigation system and/or a central controller as previously described.

FIG. 5C illustrates a flowchart showing a training procedure 570 that can be implemented instead of (or in addition to) the mapping method 540 discussed with reference to FIG. 5B. The training procedure 570 can be used to "teach" the navigation system the values of coordinates (e.g., of a perimeter, reference location, etc.) as they would actually be measured by a navigation system disposed on an object. The training procedure begins in Block 572, by defining the tracking area logically as described above for Block 544 of the mapping process 540. In Block 574, a training run is performed wherein the object is physically moved around the perimeter of the tracking area while the navigation system is operating. At one or more selected locations, the coordinates of the location as actually measured by the navigation system are recorded and suitably stored (Block 578). In one embodiment, the coordinates are stored by the navigation system, while in other embodiments, the coordinates are stored on a portable, hand-held device. In some embodiments, the selected coordinate locations can be marked by, for example, a magnetic marker, RF transmitter, an access point (AP), or other suitable indicator.

Because the coordinates recorded in Block 578 are taken directly from the navigation system on a training run, these coordinates better account for features of the particular tracking area at a site including, for example, local topography and local magnetic field deviations (including magnetization of the object). Accordingly, these coordinates are better representative of the coordinates that are actually determined during normal use of the navigation system. Training runs can be performed to measure the coordinates of any suitable location in or around the tracking area. In certain embodiments, training runs are repeated one or more times to determine a more accurate set of coordinates. For example, the training run may navigate the perimeter in both a clockwise and a counterclockwise direction, and the resulting coordinate values may be suitably averaged. Training runs can be repeated as necessary when features of the tracking area change.

In Block 582, the coordinate data is transferred to a navigation system or a central controller or other suitable device. In some embodiments, the training procedure 570 is performed with each object (e.g., each shopping cart), and each object is configured to store an individualized set of coordinates. However, if there are many such objects (e.g. a retail store with numerous shopping carts), it may reasonably be assumed that each object will respond similarly to the local magnetic field. Accordingly, in some embodiments, the training process is performed on one (or a small group) of objects. The coordinate data taken from the trained objects is then transferred into the navigation systems of the remaining objects. In certain embodiments, the training procedure 570 is repeated from time-to-time to ensure that the navigation system has access to up-to-date coordinates.

In some embodiments, an access point (AP) is used to communicate coordinate data to the objects. For example, the coordinate data taken from a training run performed by one object can be transferred to the AP, which then communicates the coordinate data to the other objects. In other embodiments, an AP can communicate up-to-date coordinate data to the object each time the navigation system begins navigating. For example, as shown in FIG. 1, the access point 136 can communicate current coordinate data to a shopping cart 122 whenever the shopping cart 122 leaves the exit 126 and begins navigating in the parking lot 114. In such embodiments, the AP 136 can be used to communicate other information to (and/or from) the carts 122.

In certain preferred embodiments, the coordinates of a boundary or a reference location are determined by a combination of the mapping method 540 and the training method 570. For example, an initial set of coordinates can be determined from a geomagnetically corrected map using the mapping method 540. Corrections to the map coordinate values are determined by the training procedure 570. The training procedure 570 can be repeated as needed, e.g., if nearby construction causes additional or different magnetic field deviations or if the remnant magnetization of the objects changes with time.

Other methods of determining the coordinates of the boundary or other reference locations in the tracking area are possible. The discussion herein is intended to be illustrative of some examples of these methods and is not intended as a limitation on the scope of such methods.

V. Magnetic Markers

A facility may wish to communicate information to systems, devices, and objects that move or are otherwise transported throughout the facility. Accordingly, it may be advantageous to dispose throughout the facility one or more markers configured to provide information to other systems, devices, or objects. In some cases, this information relates to a position within the facility. For example, as has been described, it may be advantageous to communicate reference position information to a navigation system to reduce the accumulation of navigation errors. In some embodiments, the markers may be disposed in certain locations where the facility desires to track the position of objects. For example, a retail store can place markers at the entrance and/or exit of selected aisles or checkout lanes. The navigation system can detect an entrance marker and start navigating in the aisle until the system detects an exit marker and it stops navigating. By navigating only in certain locations, the navigation system beneficially reduces power consumption.

However, the facility may wish to communicate information to systems other than navigation systems. For example, as part of a loss prevention system, a retail store may configure the anti-theft system on a shopping cart to lock its wheels if it senses a signal from a marker at the store's perimeter. Additionally, a retail store may wish to determine which shopping carts have passed through a checkout lane before exiting the store. The retail store can dispose a marker at the checkout lane and a marker at the exit. Sensors in the cart can detect the presence of the markers, and an anti-theft system can be activated if a cart passes the exit marker without first having passed the checkout lane marker. Moreover, the facility may wish to mark selected points within the facility, such as, for example, entrances and exits to aisles in a retail store or various patient service locations within a hospital. By marking such points and providing a sensor in suitable objects, the facility can determine, for example, which objects have passed the marker, as well as the time of passage and for how long the object was in the vicinity of the marker.

A system of markers has many additional uses. For example, a retail store can provide targeted advertising to customers who travel down selected aisles. In addition, the store may desire to detect patterns suggestive of shoplifting (e.g., where a customer places an item in a shopping cart and passes through a checkout lane, but later fills the cart with additional merchandise, and leaves the store without paying for the additions). By monitoring the times when objects pass certain locations, the floorplan of the facility can be organized to improve ease of use, traffic flow, and access to highly desired items. Facilities may wish to perform data mining on the information acquired from a marker system to better understand customer choices and behavior. Warehouses can use a marker system to track the flow of inventory. Many variations are possible.

Accordingly, it is desirable to provide a reliable design for a marker that can provide information to other systems operating within a facility.

a. Directional Marker

Figure 6:
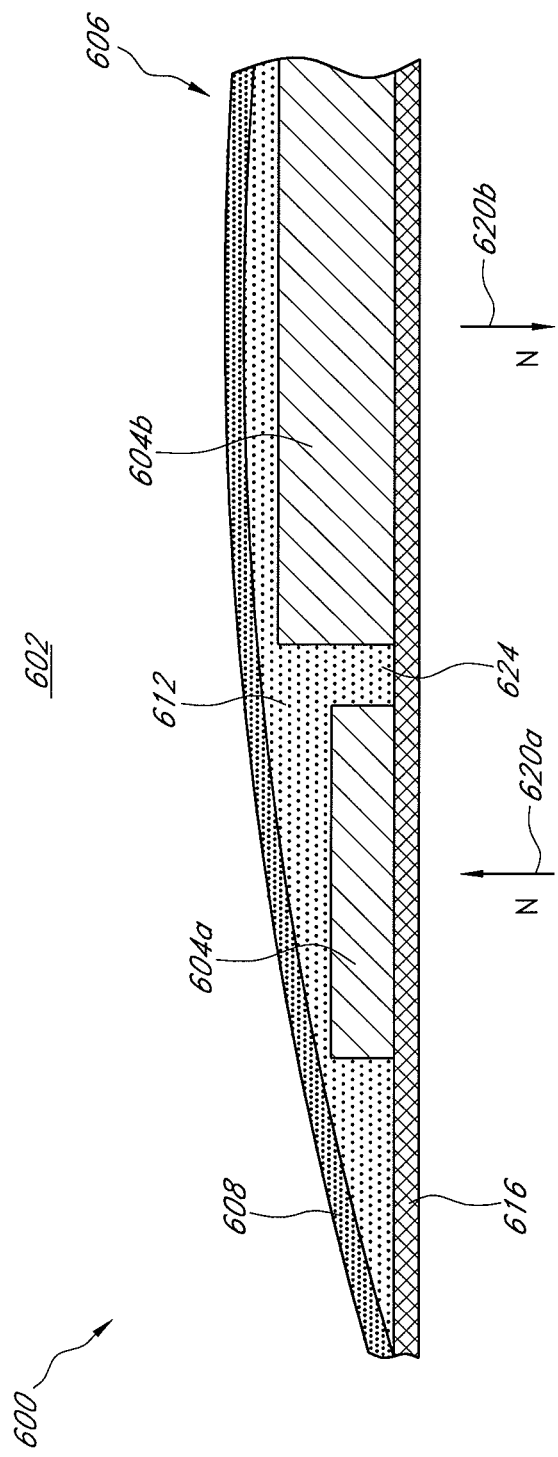
FIG. 6 is a partial cross-sectional view of an embodiment of a magnetic marker.

FIG. 6 illustrates a partial cross-section of an embodiment of a magnetic marker 600. The marker 600 comprises two magnetic elements 604a and 604b disposed within a housing 606. The housing 606 comprises a top cover 608 and a bottom plate 616. A filler material 612 is disposed within the housing 606 and substantially surrounds the magnetic elements 604a, 604b. Although the marker 600 comprises two magnetic elements 604a, 604b, any other number of magnetic elements can be used. For example, other embodiments comprise one, three, four, five, six, seven, eight, nine, ten, or more magnetic elements.

In the embodiment shown in FIG. 6, the magnetic elements 604a and 604b comprise permanent magnetic material. In an embodiment, the magnetic material comprises a flexible magnetic strip or a portion of a flexible magnetic sheet. The flexible magnetic material may comprise, for example, ferrite in a plastic binding (e.g., vinyl). In other embodiments, the magnetic material is a ferromagnetic metal or a ceramic. In one embodiment, the magnetic elements 604a, 604b are non-permanent magnets, such as electromagnets. It is preferable, but not necessary, for the magnetic material to support higher magnetic energies in order to resist demagnetization caused by ambient electromagnetic fields (e.g., AC magnetic fields produced by motors). The magnetic elements 604a and 604b can be attached to the bottom plate 616 by adhesives or other suitable means to prevent slipping and to preserve the spatial orientation and spacing of the elements 604a, 604b. For example, in the embodiment shown in FIG. 6, the magnetic elements 604a and 604b are separated by a region 624 that comprises the filler material 612. The spacing, configuration, and magnetic orientation of the magnetic elements 604a, 604b can be selected so that the magnetic marker 600 provides a suitable magnetic signal to other systems or components. In one embodiment, the magnetic element 604b has a width of about 0.75 inches, and the housing is about 0.25 inches in height.

In order for magnetic flux from the magnetic elements 604a and 604b to penetrate to regions 602 outside the marker 600 so as to a convey a magnetic signal, at least a portion of the housing 606 should comprise a nonmagnetic material. As shown in FIG. 6, the top cover 608 comprises a nonmagnetic material, for example, a non-ferromagnetic substance such as aluminum or non-magnetic stainless steel. Other materials having sufficiently small magnetic susceptibilities may also be used such as, for example, plastic compounds. In various embodiments of the housing 606, the bottom plate 616 may comprise either a non-magnetic or a magnetic material. For example, in one embodiment, the bottom plate 616 comprises mild steel, which substantially shields regions below the marker 600 from magnetic flux from the magnetic elements 604a, 604b. A benefit of using a magnetic bottom plate 616 is that magnetic fields arising from magnetized objects disposed below the marker 600 are (partially) shielded by the bottom plate 616 and do not penetrate into the region 602 above the marker 600.

The magnetic marker 600 illustrated in FIG. 6 is configured for use in an area traversed by wheeled carts, such as the entrance/exit of a retail store. Accordingly, the top cover 608 of the housing 606 is selected to have a slightly convex shape to enable wheeled carts to easily roll over the marker 600. Other shapes are possible depending on where the marker is placed and for what purposes it is used. For example, some embodiments of magnetic markers are buried just below the surface of a floor (or in a wall) and may have almost any suitable shape such as generally rectangular or cylindrical.

The filler material 612 substantially fills the space within the housing 606 surrounding the magnetic elements 604*a* and 604*b*. The filler material 612 preferably is non-magnetic and may comprise, for example, a polyurethane foam, a plastic (e.g., nylon), or other suitable cushioning or padding material. The filler material 612 provides support against compression stresses applied to the marker 600 (e.g., the weight of shopping carts). In embodiments not subject to substantial stress, the filler material may be omitted.

The magnetic fields provided by the magnetic elements 604*a* and 604*b* can be selected to provide a suitable magnetic signal from the marker 600. In the embodiment shown in FIG. 6, the magnetic element 604*a* (604*b*) is arranged with its North pole pointing upward (downward) as indicated by arrow 620*a* (620*b*). The elements 604*a*, 604*b* are spaced apart by the region 624. By selecting elements with different strengths and by selecting the configuration (e.g., direction and spacing) of the elements, many different magnetic signals can be produced. For example, the orientations of the North poles of the elements 604*a*, 604*b* could each be flipped 180 degrees, or the elements 604*a*, 604*b* could be configured so that their magnetic axes are horizontal (e.g., the arrows 620*a*, 620*b* would be horizontal). Many configurations for one or more magnetic elements can be selected, and the configuration and orientation shown in FIG. 6 is intended to be illustrative and not to be limiting.

As is well known, the total magnetic field produced by more than one magnetic element is the vector sum of the magnetic fields of the individual magnetic elements. FIG. 7A illustrates magnetic field lines 704 arising from the marker 600 shown in FIG. 6. Arrowheads on the magnetic field lines 704 indicate the direction of the magnetic field. Additionally, the magnetic field is relatively more intense in regions with a high density of field lines as compared to a region with a low density of field lines. As shown in FIG. 7A, the magnetic field direction is from the left to the right in region 706 located above and between the elements 604*a*, 604*b*. The field lines 704 are relatively closely spaced in the region 706, which indicates the magnetic field is relatively strong there. Accordingly, the predominant magnetic signal from the marker 600 is a magnetic field pointing from left to right as indicated by arrow 708.

Figure 7B:
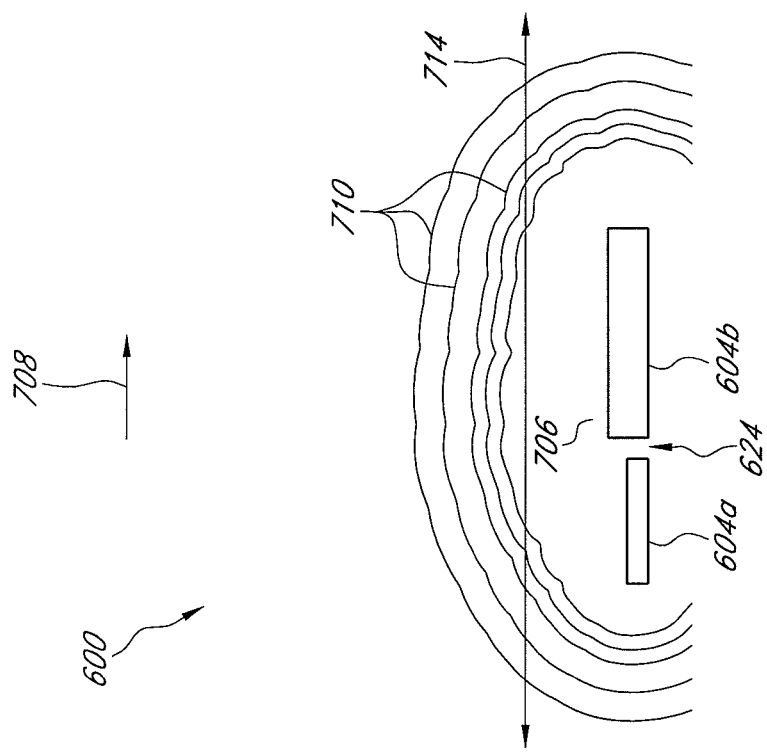
FIG. 7B schematically illustrates contours of magnetic field strength associated with the magnetic marker shown in FIG. 6.
Figure 7A:
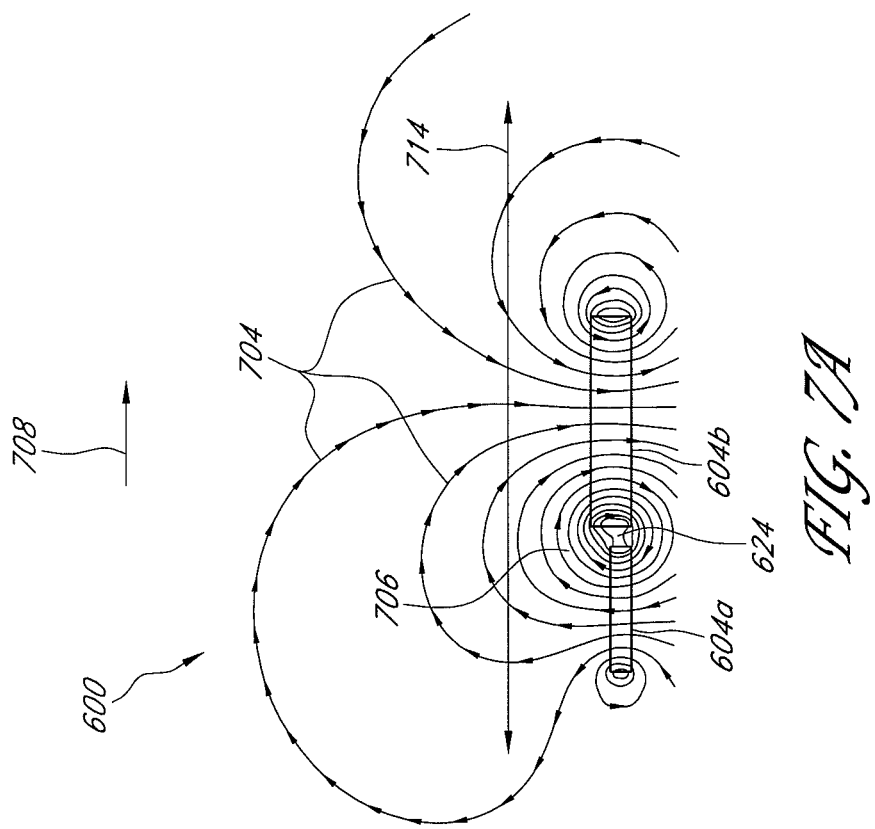
FIG. 7A schematically illustrates magnetic field lines associated with the magnetic marker shown in FIG. 6.

FIG. 7B is a contour plot showing the magnitude (strength) of the total magnetic field vector produced by the marker 600. The magnitude of the field is roughly constant on oval-shaped sections 710 surrounding the marker 600, and the field strength decreases with distance away from the marker 600. Because the oval sections 710 are elongated in the direction of the arrow 708, a magnetic sensor moving above the marker 600 (e.g., along a path indicated by double-headed arrow 714) will sense a field that is roughly constant in the region 706.

The fields shown in FIGS. 7A and 7B are produced under the assumptions that the bottom plate 616 of the marker 600 is not ferromagnetic and that there are no other substantial magnetic disposed below the bottom plate 616. Such magnetic elements would distort the field above the marker 600 somewhat (e.g., in the region 706), but would not significantly effect the overall shape, direction, or strength of the magnetic field above the marker 600.

The marker 600 advantageously indicates both a position and a direction (e.g., the direction of the arrow 708). By placing the marker 600 in a selected location in a facility and by orienting the marker 600 so that its predominant magnetic field direction points in a desired direction, an object passing the marker 600 can detect the presence and the direction of the magnetic signal. For example, in an embodiment suitable for a retail store, the marker 600 is located at an entrance/exit with the magnetic signal direction 708 pointing out the door (e.g., toward the parking lot). A magnetic field sensor disposed on a cart can detect the magnetic signal and determine whether the cart is entering or exiting the store. In similar fashion, the marker 600 can be located at the entrance or exit of an aisle, checkout lane, storeroom, or other suitable location in a facility.

Embodiments of the marker 600 are especially suitable for use with the navigation system disclosed herein, because they enable embodiments of the navigation system to determine when to begin operating (e.g., when exiting the store), when to stop operating (e.g., when entering the store), or when to reset position (e.g., when passing a reference marker).

The magnetic signal from a marker can be detected by any suitable magnetic sensor, such as, for example, inductive sensors, magnetoresistive (MR) sensors, Hall effect sensors, search coils, flux gate sensors, and/or microelectromechanical systems (MEMS) magnetic sensors. In certain embodiments, the magnetic sensor comprises a thin-film solid state sensor such as an anisotropic magnetoresistance (AMR) sensor and/or a giant magnetoresistance (GMR) sensor.

In various embodiments, the magnetic field produced by the marker 600 may have a strength (at the position of an object's magnetic sensor) in a range from about 1 milliGauss to about 20 Gauss. In certain embodiments, the marker 600 has a field strength less than about 15 Gauss to avoid degradation of the signal from the magnetic sensors, particularly if AMR magnetic sensors are used.

Although the magnetic marker 600 comprises a housing 606, other embodiments do not include a housing. Markers can be embedded, for example, within walls or floors of a structure, which acts similarly to the housing 600 to support and protect the magnetic elements.

b. Perimeter Marker

Many other magnetic markers are possible. FIGS. 8A and 8B illustrate the magnetic signal produced by a marker 800, which comprises a single magnetic element 802 oriented so that its magnetic axis is horizontal (e.g., the North pole of the element 802 points toward the right). The magnetic element is disposed below a surface 806 of a suitable tracking area. In some embodiments, an upper portion of the magnetic element 802 is less than an inch below the surface 806. Magnetic sensors in objects, such as wheeled carts, pass above the surface 806 at a level shown by double-headed arrow 814. It is preferable, although not required, for the magnetic sensors to be placed as close to the surface 806 as is practical, because the magnetic dipole field strength decreases with distance. Also, placing the sensors close to the surface 806 can improve a signal-to-noise ratio of the magnetic field measurements. For example, reducing the magnetic sensor height above the surface 806 from 0.7 inches to 0.55 inches doubles the field strength at the sensor in one embodiment. In some embodiments, the sensor level 814 is disposed about one inch above the surface 806, and in some preferred embodiments, is disposed about 0.7 inches above the surface 806. In other preferred embodiments for use with a shopping cart having a standard, 5-inch wheel, the sensor level 814 is about 0.55 inches to about 0.6 inches above the surface 806.

FIG. 8A illustrates magnetic field lines 804, and FIG. 8B illustrates contours of magnetic strength 810. As can be seen by comparing FIGS. 8A, 8B with FIGS. 7A, 7B, the magnetic signal produced by the marker 800 is substantially different in shape and direction from the magnetic signal produced by the marker 600. In addition, the field strength contours 810 in FIG. 8B are elongated vertically, so the magnetic signal is typically of shorter duration.

The magnetic signal produced by the marker 800 is distinguishable from the magnetic signal produced by the marker 600. Accordingly, certain embodiments use the markers to indicate different types of locations. In certain embodiments, the marker 800 is used to mark the position of the perimeter of a tracking area. In certain such embodiments, it can be used to replace (or supplement) existing perimeter markers such as, for example, buried VLF transmission wires. In one embodiment, the marker 800 is buried with the magnetic axis of the magnetic element 802 pointing outward so that a cart can determine whether it is exiting or entering the tracking area.

In certain embodiments, the magnetization per unit length of the marker 800 may vary along the marker's length. An object crossing the marker 800 can detect the degree of magnetization and perform a suitable action. For example, the magnetization per unit length can be high in regions where an anti-theft system should be activated (e.g., by locking a wheel), and the magnetization per unit length can be low in other regions where cart passage is permitted.

In some facilities, carts may be physically capable of passing through certain exits, but a facility policy may prohibit such passage except in certain circumstances. For example, a facility may have one or more emergency exits and may wish to determine whether a cart is passing the exit in violation of the facility policy (e.g., in a non-emergency). In such cases, the facility may wish the cart to exhibit a different behavior than when exiting the perimeter (e.g., a different alarm may sound). A marker having a magnetic signal different from the normal exit signal (e.g., the signal from the marker 600) may be used in such a situation. Alternatively, such unacceptable exits can be marked similarly to the confinement perimeter (e.g., by using the marker 800), in which case an exiting cart will trigger an anti-theft system. Many variations are possible, and a facility may utilize markers having a wide range of magnetic signals to indicate different physical locations and/or directions.

c. Magnetic Bar Code Marker

Figure 9:
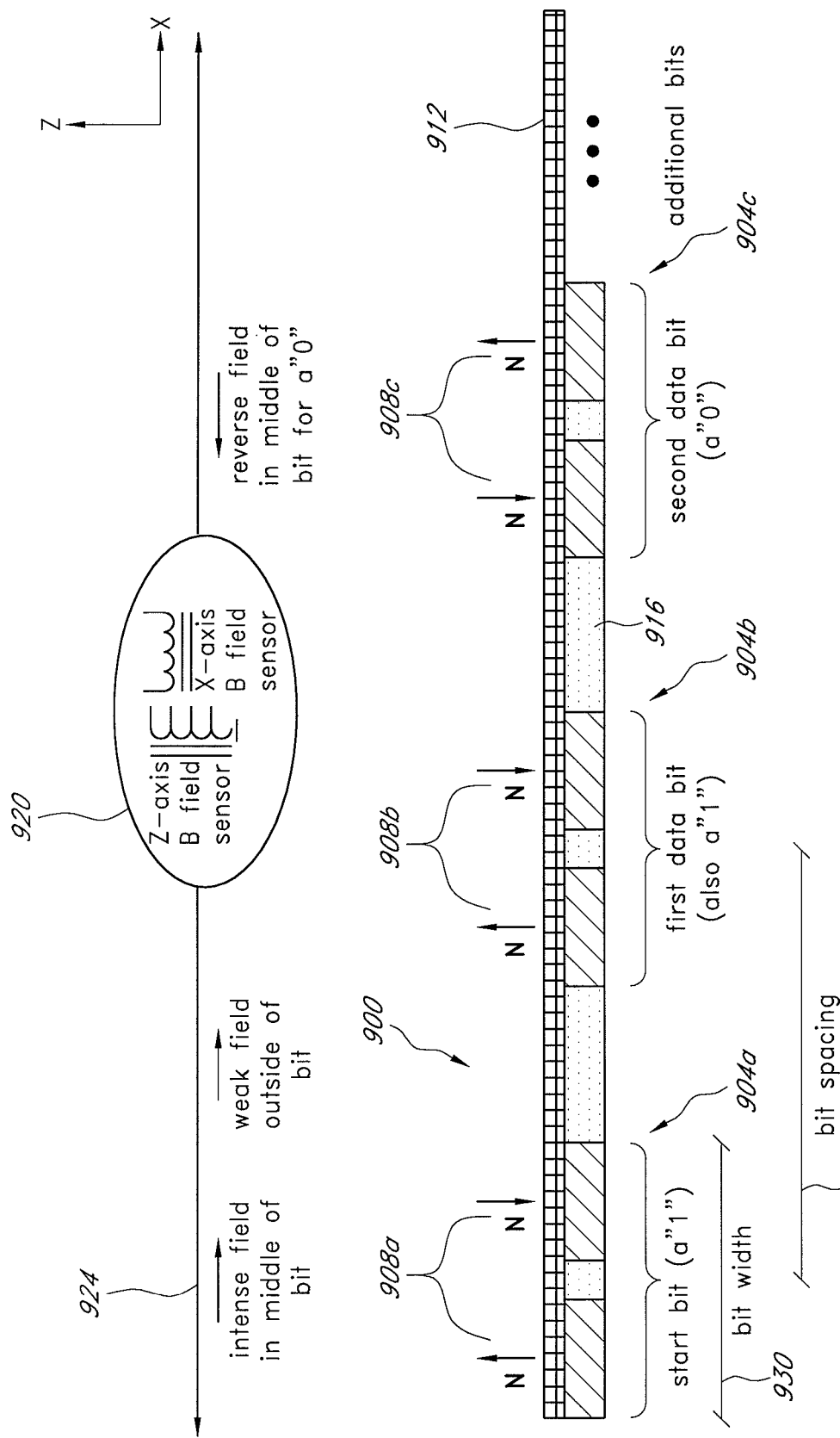
FIG. 9 schematically illustrates an embodiment of a magnetic bar code marker that provides a magnetic bar code signal.

Embodiments of the magnetic markers discussed above can be combined to provide magnetic signals that convey more information than a single marker. For example, in certain embodiments, markers can be combined to produce a "magnetic bar code" signal that encodes information as a series of magnetic bits. FIG. 9 schematically illustrates one embodiment of a magnetic bar code marker 900 that comprises a number of magnetic markers 904a, 904b, 904c, etc. that are configured to represent bits in the magnetic bar code. In certain embodiments, each marker, such as the markers 904a-904c, represents one bit, although this is not a requirement. Although FIG. 9 shows three magnetic markers, any number of markers can be used in other embodiments (e.g., 2, 4, 8, 10, 12, 16, or more) so as to convey a suitable number of bits of information. Accordingly, the three markers shown in FIG. 9 are not intended to be a limitation on the number (or type or configuration) of markers that can be used or a limitation on the number of bits of information that can be communicated.

In the embodiment shown in FIG. 9, each of the markers 904a-904c comprises a pair of magnetic elements. The magnetic elements can be generally similar to the magnetic elements 604a and 604b. For example, the magnetic elements may comprise a permanent magnetic material such as, for example, a portion of a flexible magnetic strip. In one embodiment suitable for use in retail stores, the magnetic strip is about 0.25 inches in width and about 0.03 inches in height. The magnetic elements within the magnetic markers 904a-904c and/or the magnetic markers themselves can be separated by a spacer material 916, which comprises plastic (e.g., nylon) in one embodiment. Other materials can be used. As shown in FIG. 9, the magnetic elements may be disposed below a surface 912 over which objects move. The surface 912 preferably is non-magnetic so that magnetic flux from the magnetic markers 904a-904c extends into the region above the surface 912 so as to produce a detectable magnetic bar code signal. As shown in FIG. 9, the surface 912 is horizontal, but this is not a limitation. Any of the magnetic markers disclosed herein can be used in any orientation including, for example, horizontal, vertical, or at any other angle.

The magnetic bar code signal encodes information as a sequence of bits that are read as an object having a magnetic sensor moves relative to the magnetic bar code marker 900. In certain embodiments, the magnetic bar code comprises data bits, start/stop bits, and/or error correction bits. The data bits encode the information to be communicated to the object, generally as a sequence of "1"'s and "0"'s. Any number of data bits can be used. The start and/or stop bits may be included at the beginning and/or the end of the sequence of data bits to enable the object to determine if it is reading the sequence of data bits forward (from the most significant bit) or backward (from the least significant bit). The start/stop bits can have the same magnetic signature as a data bit (e.g., a "1" or a "0") or may have a different magnetic signature. In some embodiments, the bar code signal includes an error correcting code, which may comprise, for example, one or more checksum bits that encode a numerical value corresponding to the data bits.

The magnetic markers 904a-904c can be configured to represent a "1" bit or a "0" bit, for example, by orienting the magnetic axes of the magnetic elements in a distinctive configuration. In the embodiment shown in FIG. 9, a "1" bit is represented by a pair of magnetic North poles arranged in an "up"-"down" configuration, and a "0" bit is represented by a pair of magnetic North poles in a "down"-"up" configuration (as measured from left to right). In FIG. 9, the markers 904a and 904b represent "1" bits, and the marker 904c represents a "0" bit. The orientations of the magnetic fields in the bits are shown as arrows 908a-908c. FIG. 9 illustrates one embodiment for configuring magnetic bits, and other embodiments can use different magnetic configurations and/or orientations and/or different numbers of magnetic elements.

In the embodiment shown in FIG. 9, the magnetic bar code begins with a start bit 904a and ends with a stop bit (not shown). In this embodiment, both the start and stop bits are "1" bits, although other choices may be used. An object encountering the marker 900 can distinguish the start bit from the stop bit (even though both are represented as "1"'s) by measuring the magnetic field arrangement within the bit. For example, as shown in FIG. 9, if the bar code marker 900 is first encountered at a position corresponding to the start bit 904a (e.g., from the left in FIG. 9), the object will measure an "up"-"down" field configuration. However, if the bar code marker 900 is first encountered at a position corresponding to the stop bit (e.g., from the right in FIG. 9, which does not show the stop bit), the object will measure a "down"-"up" field configuration. By sensing the magnetic field configuration in the start and stop bits, an object can readily determine whether it is sensing the bar code from the beginning of the sequence (e.g., the most significant bit) or the end of the sequence (e.g., the least significant bit).

The information to be communicated to an object is encoded by the bar code marker 900 as a sequence of data bits beginning with bits 904b and 904c and continuing for any suitable number of additional bits. In some embodiments, one or more checksum bits are included following the data bits. In certain embodiments, from two to thirty two data bits are used.

In certain embodiments, the entire sequence of data bits of the bar code marker 900 may be a codeword of a forward correction error code. For example, in some embodiments, a Hamming code is used. For example, an (11,7) Hamming code allows 128 unique locations to be specified using 13 bits, with 11 bits of codeword and a start bit and a stop bit, may be used, particularly in retail store implementations. Because the information in the bar code marker 900 generally needs to be readable in either direction (e.g., from left to right and from right to left) in many implementations, a variation of the Hamming code that also encodes the start and stop bits is used in some of these implementations.

The magnetic markers 904a-904c have a bit width 930 that can be selected by adjusting the width and spacing of the magnetic elements in the magnetic markers 904a-904c. Additionally, the individual bits are separated by a bit spacing 934. The bit width 930 and the bit spacing 934 can be selected so that a magnetic sensor 920 moving along a path 924 can detect the individual bits while moving at a representative speed. For example, in an embodiment suitable for use in a retail store, the bit width 930 is about 0.6 inches and the bit spacing is about 1 inch. In some of these embodiments, eight to twelve bits are used, so that the magnetic bar code marker 900 has a width of about 12 inches.

The magnetic sensor 920, in some embodiments, comprises a two-axis magnetic sensor configured to detect magnetic field components in the directions of the x-axis (e.g. the direction of motion of the object) and the z-axis (e.g. perpendicular to the direction of motion). In a retail store environment, the magnetic sensor 920 may be disposed in shopping carts (or other suitable objects) so that the path 924 of the magnetic sensor 920 is about 0.8 inches above the surface 912. In one embodiment, the magnetic sensor 920 is about 0.65 inches above the surface 912. Other embodiments utilize distances between about 0.5 inches and about 1 inch. Other distances are possible, however, it is preferable for the sensors to be close to the surface 912 for reasons similar to those discussed herein with reference to FIGS. 8A and 8B.

In the example shown in FIG. 9, a magnetic sensor 920 moving across the magnetic bar code from left to right will read the bar code bits ("1", "1", "0", . . . ) by detecting an intense magnetic field in the x-direction in the middle of each bit and a weak field in the region between or outside the bits. In this embodiment, the magnetic sensor 920 can discriminate between "1" and "0" bits by detecting a field predominantly to the right for a "1" bit and to the left for a "0" bit. FIG. 10A illustrates magnetic field lines 940a, 940b, and 940c corresponding to the magnetic bits 904a, 904b, and 904c. FIG. 10B illustrates field strength contours 944a-944c corresponding to the magnetic bits 904a-904c. FIGS. 10A and 10B further demonstrate aspects of the magnetic field direction and strength that can be detected by the magnetic sensor 920.

In some embodiments, the magnetic sensor 920 includes a z-axis magnetic field sensor (as shown in FIG. 9) to assist an x-axis sensor in discriminating bit-fields from extraneous magnetic fields (e.g., those not carrying bar code information). For example, as shown in FIG. 10A, the magnetic field at the beginning and end of each individual bit is predominantly in the z-axis direction (e.g., vertical), while the field in the center of each bit is predominantly in the x-axis direction (e.g., horizontal). Certain embodiments of the magnetic sensor 920 use the z-axis sensor to detect the beginning and end of a bit and the x-axis sensor to determine whether the bit is a "1" or a "0" (e.g., whether the central field is to the right or to the left, respectively). However, other embodiments of the magnetic sensor 920 include only a 1-axis magnetic field sensor (preferably to detect x-axis fields), while some embodiments include a three-axis sensor to better discriminate bit-fields from extraneous fields.

If a three-axis magnetic sensor 920 is used, then in some embodiments the y-axis sensor is used to determine a crossing angle at which the object is crossing the horizontal projection of the marker (e.g., if the object is not traveling parallel to the direction 924 shown in FIG. 9). The magnetic field in the x-direction of the marker may be readily calculated using the crossing angle.

Although embodiments of the markers 600, 800, and 900 have been shown in FIGS. 6-10B and described as being disposed horizontally (e.g., in a floor) such that objects can pass over them, this is for purposes of illustration only and is not intended as a limitation on embodiments of markers. For example, embodiments of any of the magnetic markers 600, 800, and 900 can be disposed in a ceiling (with objects passing under them), in walls, in other parts of a structure, building, tracking area (such as a parking lot), or in any other suitable location. Moreover, embodiments of any of the markers can be positioned, configured, and oriented as reasonably necessary so that the marker can provide a suitable signal to an object.

In some embodiments, the magnetic sensor 920 is configured to measure the bit-fields and to determine the information content in the magnetic bar code. The sensor 920 can communicate the bar code information to other systems such as, for example, a navigation system or an anti-theft system. In some embodiments, the bar code information comprises a code identifying a reference location and providing the values of the location's coordinates. An object passing the bar code marker can read the bar code and use the information, for example, to reset the object's position as part of an error correction procedure in a dead reckoning navigation system. In some embodiments, the information in the bar code will cause an on-board system to perform a predetermined action such as, for example, sounding an alarm or locking a wheel brake. There are many possible uses for magnetic bar code markers, and the above examples are intended to be illustrative and not limiting.

In other embodiments, the magnetic sensor 920 communicates signals indicative of the bar code magnetic fields to another system for processing. For example, in one embodiment, the magnetic sensor 920 comprises the magnetic field sensor 204 of the navigation system 200a shown in FIG. 2A. The measured magnetic fields are passed to the magnetic sensor signal conditioning module 208 and then to the processor 220 for further processing and decoding of the bar code information. In another embodiment, the magnetic fields detected by the magnetic sensor 920 are communicated for further processing and decoding to an external processing system (e.g., a central controller) by, for example, an RF data link.

In some embodiments, a magnetic bar code marker 900 is fabricated as a sequence of tiles (having the same magnetic bar code information), which are disposed adjacent each other to cover a line crossed by vehicles. In some embodiments, the tiles are rectangular, although other shapes are possible. In one embodiment, the tiles are 1-foot square tiles, constructed to have a single 7-bit code (with a single bit error correction), which provides 128 unique codes.

In certain embodiments, a two-axis sensor, such as the sensor 920, can be used to detect the bar code marker 900, but is less suited to magnetic navigation, and a three-axis sensor may be used if both marker detection and navigation are desired.

Although the invention(s) have been described in terms of certain preferred embodiments and certain preferred uses, other embodiments and other uses that are apparent to those of ordinary skill in the art, including embodiments and uses which do not provide all of the features and advantages set forth herein, are also within the scope of the invention(s). Accordingly, the scope of the invention(s) is defined by the claims that follow and their obvious modifications and equivalents.

What is claimed is:

1. A method for navigating with a human-propelled, non-motorized, wheeled cart in a tracking area comprising a first region and a second region, the method comprising:
   receiving, from a source external to the cart, a start navigation signal indicating the cart has crossed a boundary between the first region and the second region;
   performing, with a navigation system and in response to the start navigation signal, a navigation process;
   estimating, with the navigation system, a position of the cart;
   determining a heading of the cart relative to the boundary between the first region and the second region;
   determining, based at least in part on the heading of the cart and the receipt of the start navigation signal, which of the first region and the second region the cart is entering;
   performing, in response to a determination that the cart is entering the first region and in response to the receipt of the start navigation signal, a first navigation action; and
   performing, in response to a determination that the cart is entering the second region and in response to the receipt of the start navigation signal, a second navigation action that is different from the first navigation action.

2. The method of claim 1, wherein:
the first navigation action comprises detecting a confinement perimeter of the first region.

3. The method of claim 2, wherein:
the first navigation action further comprises actuating a cart movement inhibition system.

4. The method of claim 3, wherein:
actuating the cart movement inhibition system comprises actuating a wheel brake.

5. The method of claim 1, wherein:
the second region comprises a portion of a retail store; and the second navigation action comprises determining whether the cart has passed through a checkout lane in the second region.

6. The method of claim 5, wherein:
the second navigation action further comprises monitoring a duration during which the cart is present in an the checkout lane in the second region.

7. The method of claim 1, wherein:
the second region comprises a portion of a retail store; and the second navigation action comprises determining a position of the cart using dead reckoning.

8. The method of claim 7, further comprising:
determining whether the cart has passed through an aisle or a checkout lane.

9. The method of claim 7, further comprising:
providing targeted advertising to a customer whose cart passed through the aisle.

10. The method of claim 7, further comprising:
detecting patterns suggestive of shoplifting.

11. The method of claim 7, further comprising:
gathering information related to clustering or queuing of carts in the retail store.

12. The method of claim 1, wherein:
receiving the start navigation signal comprises detecting a magnetic signature from a magnetic marker.

13. The method of claim 1, further comprising:
detecting a stop navigation signal; and
stopping any navigation actions.

14. The method of claim 1, wherein:
the boundary between the first region and the second region comprises a confinement boundary of a parking lot of a retail store;
the first region comprises the parking lot; and
the second region comprises an area beyond the confinement boundary of the parking lot.

15. The method of claim 14, wherein:
the second navigation action comprises actuating a cart movement inhibition system to inhibit motion of the cart; and
the first navigation action comprises deactuating the cart movement inhibition system.

16. The method of claim 15, wherein:
the first navigation action further comprises detecting a wheel vibration signature prior to deactuating the cart movement inhibition system.

17. The method of claim 1, wherein estimating the position of the cart comprises implementing a dead reckoning algorithm.

18. The method of claim 17, wherein implementing the dead reckoning algorithm comprises:
measuring, with a magnetic sensor, at least two components of a magnetic field;
measuring, with a sensor, an amount of rotation of a wheel of the cart; and
determining, with a processor, and using at least the measured at least two components of the magnetic field and the measured amount of rotation of the wheel, the estimated position of the cart.

19. The method of claim 1, wherein performing the navigation process comprises setting a clock in the navigation system or setting coordinates of the cart in the navigation system.

20. The method of claim 1, wherein receiving the start navigation signal comprises decoding the start navigation signal.

21. The method of claim 1, wherein performing the navigation process comprises changing a power mode of the navigation system.

22. The method of claim 1, wherein the navigation signal comprises a radio frequency signal.

* * * * *